(12) United States Patent
Shimada

(10) Patent No.: US 7,675,688 B2
(45) Date of Patent: Mar. 9, 2010

(54) ZOOM LENS SYSTEM, OPTICAL DEVICE WITH ZOOM LENS SYSTEM, AND METHOD OF MANUFACTURING ZOOM LENS SYSTEM

(75) Inventor: Toshiyuki Shimada, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/335,222

(22) Filed: Dec. 15, 2008

(65) Prior Publication Data
US 2009/0161229 A1 Jun. 25, 2009

(30) Foreign Application Priority Data
Dec. 25, 2007 (JP) ............................ P2007-331793

(51) Int. Cl.
*G02B 15/14* (2006.01)
(52) U.S. Cl. .................. 359/680; 359/682; 359/683; 359/684; 359/685; 359/689; 359/716; 359/740; 359/784
(58) Field of Classification Search .................. 359/680, 359/682–685, 689, 716, 740, 784
See application file for complete search history.

(56) References Cited

U.S. PATENT DOCUMENTS

| | | | | |
|---|---|---|---|---|
| 7,180,683 B2 * | 2/2007 | Mizuguchi et al. | .......... | 359/689 |
| 7,212,349 B2 * | 5/2007 | Mitsuki | ...................... | 359/682 |
| 7,215,483 B2 | 5/2007 | Sekita | | |
| 7,227,696 B1 * | 6/2007 | Nanba | ......................... | 359/682 |
| 7,227,700 B2 * | 6/2007 | Oshita | ......................... | 359/689 |
| 7,283,314 B2 * | 10/2007 | Nanba | ......................... | 359/784 |
| 7,446,956 B2 * | 11/2008 | Shimada | ..................... | 359/784 |
| 2006/0262423 A1 * | 11/2006 | Kiyotoshi | .................... | 359/689 |
| 2007/0014030 A1 * | 1/2007 | Iwasawa et al. | ............. | 359/680 |
| 2007/0217025 A1 * | 9/2007 | Kurioka | ...................... | 359/689 |
| 2007/0285801 A1 * | 12/2007 | Yoshitsugu | .................. | 359/689 |

FOREIGN PATENT DOCUMENTS

| EP | 1 868 022 A1 | 12/2007 |
|---|---|---|
| JP | 2006-84829 A | 3/2006 |
| JP | 2007-004122 A | 1/2007 |

* cited by examiner

*Primary Examiner*—Evelyn A. Lester
(74) *Attorney, Agent, or Firm*—Miles & Stockbridge P.C.

(57) ABSTRACT

A zoom lens system comprising, in order from an object along an optical axis: a first lens group having a negative refractive power; a second lens group having a positive refractive power; and a third lens group having a positive refractive power; the following conditional expression being satisfied:

$$0.6 < Y_{max} \times ft/f1^2 < 1.0$$

where Ymax denotes the maximum image height of the zoom lens system, ft denotes a focal length of the zoom lens system in a telephoto end state, and f1 denotes a focal length of the first lens group.

23 Claims, 23 Drawing Sheets

ZOOM LENS SYSTEM, OPTICAL DEVICE WITH ZOOM LENS SYSTEM, AND METHOD OF MANUFACTURING ZOOM LENS SYSTEM

BACKGROUND OF THE INVENTION

1. Field of the Invention

The present invention relates to a zoom lens system and an optical device equipped with the zoom lens.

2. Related Background Art

Recently, imaging apparatus (cameras) such as digital still cameras and digital video cameras using solid-state imaging devices have rapidly been attaining higher performances and more compact sizes. In general, these imaging apparatus employ zoom lens systems as their imaging lenses. The zoom lens systems allow photographers to easily take a picture with an optimal angle of view for a shooting condition. Though there have currently been strong demands for these zoom lens systems to achieve wider angle and higher variable power, only very few examples of zoom lens systems have been proposed which enable sufficiently telephoto shooting while having an angle of view of 70 to 80 degrees or greater in the wide-angle end state.

Known as an example achieving wider angle and higher variable power ratio at the same time is the lens system of Example 2 in Japanese Patent Application Laid-Open No. 2006-084829.

SUMMARY OF THE INVENTION

However, the conventional zoom lens systems have a problem that aberrations may not fully be corrected in the wide-angle end state, thus failing to achieve favorable imaging performances.

In view of such a problem, it is an object of the present invention to provide a compact zoom lens system, suitable for solid-state imaging devices, having excellent performances while achieving a wide angle and a high variable power ratio.

For purposes of summarizing the invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessary achieving other advantages as may be taught or suggested herein.

For overcoming the above-mentioned problem, the zoom lens system in accordance with the present invention comprises, in order from an object along an optical axis, a first lens group having a negative refractive power, a second lens group having a positive refractive power, and a third lens group having a positive refractive power. The zoom lens system is constructed such as to satisfy the following conditional expression:

$$0.6 < Ymax \times ft/f1^2 < 1.0$$

where Ymax denotes the maximum image height of the zoom lens system, ft denotes a focal length of the zoom lens system in a telephoto end state, and f1 denotes a focal length of the first lens group.

Preferably, the zoom lens system satisfies the following conditional expression:

$$0.47 < (N2nav - 0.8) ft \cdot \tan \omega w / TLw < 0.95$$

where N2nav denotes an average refractive index value of materials of all the negative lenses included in the second lens group at d-line, ωw denotes a half angle of view of the zoom lens system in a wide-angle end state, TLw denotes a total length of the zoom lens system in the wide-angle end state, and ft denotes the focal length of the zoom lens system in the telephoto end state.

Preferably, the zoom lens system satisfies the following conditional expression:

$$0.3 < ft \times L12t/|f1| < 2.0$$

where L12t denotes a distance along the optical axis between the lens surface closest to an image in the first lens group and the lens surface closest to the object in the second lens group in the telephoto end state, ft denotes the focal length of the zoom lens system in the telephoto end state, and f1 denotes the focal length of the first lens group.

Preferably, the zoom lens system satisfies the following conditional expression:

$$0.36 < Nn - Np < 0.80$$

where Nn denotes the highest refractive index of materials of negative lenses included in the second lens group at d-line, and Np denotes the lowest refractive index of materials of positive lenses included in the second lens group at d-line.

Preferably, the zoom lens system satisfies the following conditional expression:

$$3.0 < Nn + 0.05 \times vn$$

where Nn denotes the highest refractive index of materials of negative lenses included in the second lens group at d-line, and vn denotes Abbe number of a material of a lens having the highest refractive index in materials of negative lenses included in the second lens group at d-line.

Preferably, in the zoom lens system, the second lens group has an F-number determining member and at least one positive lens positioned on the object side of the F-number determining member.

Preferably, the second lens group in the zoom lens system has, in order from the object along the optical axis, two positive lenses and one negative lens.

Preferably, the first lens group in the zoom lens system has, in order from the object along the optical axis, at least one negative meniscus lens and one positive lens.

Preferably, in this case, the negative meniscus lens constituting the first lens group is arranged closest to the object in the first lens group.

Preferably, at least the image-side lens surface in lens surfaces of the negative meniscus lens constituting the first lens group is formed aspherical.

Preferably, upon zooming from a wide-angle end state to the telephoto end state in the zoom lens system, at least the first and second lens groups move so as to decrease a distance between the first lens group and the second lens group and increase a distance between the second lens group and the third lens group.

The optical device in accordance with the present invention is constructed such as to include any of the zoom lens systems mentioned above.

When constructed as in the foregoing, the present invention can provide a compact zoom lens system, suitable for solid-state imaging devices, having excellent performances while achieving a wide angle and a high variable power ratio, and an optical device equipped with the zoom lens system.

DESCRIPTION OF THE PREFERRED EMBODIMENTS

Figure 1A:
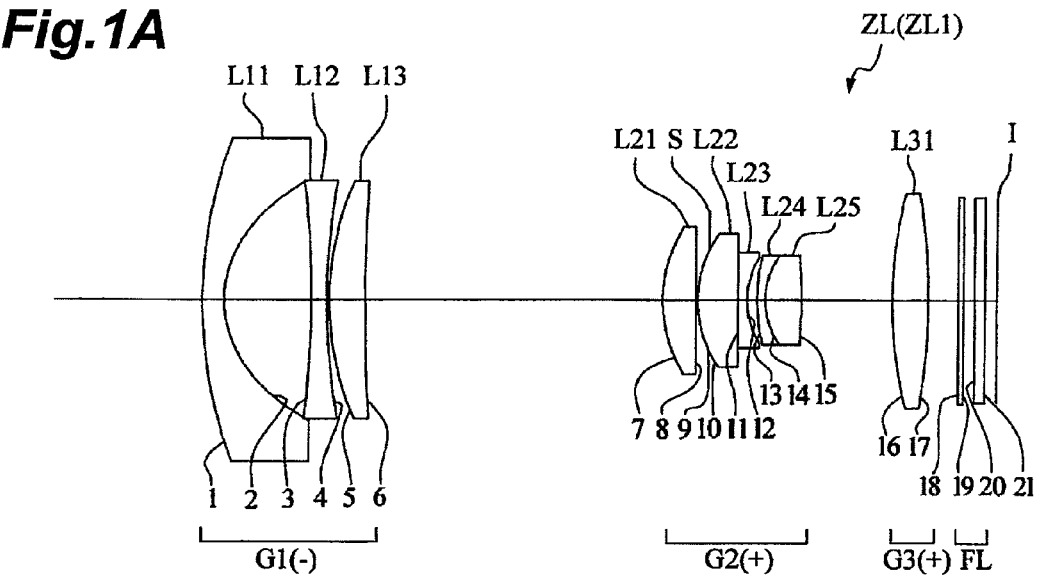
FIG. 1A is a lens configuration diagram showing the structure of the zoom lens system in accordance with Example 1 of the present invention.

In the following, preferred embodiments of the present invention will be explained with reference to the drawings. First, the following basic structure of a zoom lens system will be explained with FIGS. 1A to 1C. This zoom lens system ZL is a zoom lens system of negative preceding type comprising, in order from an object along an optical axis, a first lens group G1 having a negative refractive power as a whole, a second lens group G2 having a positive refractive power as a whole, and a third lens group G3 having a positive refractive power as a whole. In the zoom lens system ZL, the second lens group G2 acts as a variable power part and master lens group, while the first lens group G1 acts as a compensator group. The third lens group G3 is constructed such as to optimize the exit pupil position of the whole zoom lens system ZL with respect to an imaging device (depicted as an image surface I in FIGS. 1A to 1C) and correct the aberrations left after the correction by the first and second lens groups G1, G2. The zoom lens system ZL corresponds to Example 1 which will be explained later.

For achieving wider angle and higher variable power at the same time in the zoom lens system ZL having such a simple structure, various conditions must be satisfied. In particular, aberrations are hard to correct favorably unless the structure of each lens group, the refractive power of each lens, positions of aspherical lenses, and the like are appropriately set. From practical viewpoints of zoom lens systems, on the other hand, the total size of the zoom lens system ZL must be made sufficiently small so as to keep the imaging apparatus from becoming bulky. Hence, conditions for achieving a wide angle, a high variable power ratio, and high performances in the zoom lens system ZL will now be explained.

First, letting Ymax be the maximum image height of the zoom lens system, ft be a focal length of the zoom lens system in a telephoto end state, and f1 be a focal length of the first lens group, it is desirable for the zoom lens system ZL to satisfy the following conditional expression (1):

$$0.6 < Y_{max} \times ft / f1^2 < 1.0 \qquad (1)$$

The conditional expression (1) defines an appropriate range for the maximum image height of the zoom lens system ZL, its focal length in the telephoto end state, and the focal length of the first lens group G1. Here, the structure of a typical zoom lens system will be explained in brief. The first lens group G1 acts to initially form an image of an object, while the position and size of the image is determined by the focal length f1 of the first lens group G1. Its subsequent lens group variably magnifies the image formed by the first lens group G1, so as to form an image having a finally desirable size onto an imaging device surface (image surface I). Therefore, for determining the whole structure of the zoom lens system ZL, it is very important to appropriately set the focal length f1 of the first lens group G1. When the focal length f1 of the first lens group G1 is inappropriate, it becomes very hard to attain desirable variable power ratio, total size of the zoom lens system ZL, aberration correction state, and the like.

When $Ymax \times ft/f1^2$ is less than the lower limit of the conditional expression (1), the height of the principal ray passing through the first lens group G1 in the wide-angle end state becomes remarkably large. This increases the front lens diameter so much that the zoom lens system may become hard to build into imaging apparatus. When the variable power ratio is made higher in the state where $Ymax \times ft/f1^2$ is less than the lower limit of the conditional expression (1), it is necessary for the image-side principal point of the second lens group G2 to shift greatly toward the object in order to prevent the first and second lens groups G1, G2 from coming into contact with each other in the telephoto end state. This means that the telephoto ratio of the second lens group G2 becomes remarkably small, whereby aberrations are very hard to correct. In particular, upper coma is hard to correct in the whole range from the wide-angle end state to the telephoto end state.

When $Ymax \times ft/f1^2$ exceeds the upper limit of the conditional expression (1), on the other hand, the magnifications of the second and third lens groups G2, G3 remarkably increase in the telephoto end state. This tendency becomes more remarkable as the variable power ratio is higher. Therefore, aberrations generated in the first lens group G1 are enhanced by its subsequent lens group and thus become hard to correct. In particular, differences in spherical aberration dependent on wavelength in the telephoto end state become very hard to correct. Also, the Petzval sum remarkably increases on the positive side, whereby field curvature and astigmatism are hard to correct at the same time in an intermediate focal length state.

When the lower limit of the conditional expression (1) is 0.61 and/or its upper limit is 0.95, the present invention can exhibit its effects more favorably. When the lower limit of the conditional expression (1) is 0.63 and/or its upper limit is 0.9, the present invention can exhibit its effects at a maximum.

Letting N2nav be an average refractive index value of materials of all the negative lenses included in the second lens group G2 at d-line, ωw be a half angle of view of the zoom lens system in a wide-angle end state, TLw be a total length of the zoom lens system in the wide-angle end state, and ft be the focal length of the zoom lens system in the telephoto end state, it is desirable for the zoom lens system ZL to satisfy the following conditional expression (2):

$$0.47 < (N2nav - 0.8) ft \cdot \tan \omega w / TLw < 0.95 \quad (2)$$

The conditional expression (2) is a condition for favorably correcting the curvature of a sagittal image surface that becomes problematic in particular when attaining a wider angle and a smaller size in the zoom lens system ZL. In general, the curvature of the sagittal image surface becomes greater as the half angle of view ωw increases. This tendency becomes more remarkable as the zoom lens system ZL is made smaller. Though being a main cause of the increase in the curvature of the sagittal image surface, negative lenses also perform important actions in terms of aberration correction, e.g., reduce the Petzval sum to an appropriate value. The conditional expression (2) defines an appropriate range with respect to the refractive index of negative lenses having such roles contradictory to each other.

When $(N2nav-0.8) ft \cdot \tan \omega w / TLw$ is less than the lower limit of the conditional expression (2), it is unfavorable in that the curvature of the sagittal image surface increases in the wide-angle end state, thereby lowering the image quality in marginal parts of pictures. When $(N2nav-0.8) ft \cdot \tan \omega w / TLw$ exceeds the upper limit of the conditional expression (2), on the other hand, it is unfavorable in that the Petzval sum increases, so that field curvature and astigmatism are hard to correct at the same time in the intermediate focal length state.

When the lower limit of the conditional expression (2) is 0.49 and/or its upper limit is 0.9, the present invention can exhibit its effects more favorably. When the lower limit of the conditional expression (2) is 0.51 and/or its upper limit is 0.85, the present invention can exhibit its effects at a maximum. Preferably, the average value N2nav of refractive index of materials of all the negative lenses included in the second lens group G2 at d-line is greater than 1.90.

Letting L12t be the distance along the optical axis between the lens surface (e.g., surface No. 6 in FIGS. 1A to 1C) closest to the image in the first lens group G1 and the lens surface (e.g., surface No. 7 in FIGS. 1A to 1C) closest to the object in the second lens group G2 in the telephoto end state, ft be the focal length of the zoom lens system in the telephoto end state, and f1 be the focal length of the first lens group G1, it is desirable for the zoom lens system ZL to satisfy the following conditional expression (3):

$$0.3 < ft \times L12t / |f1| < 2.0 \quad (3)$$

The conditional expression (3) defines an appropriate range for the distance between the lens surface closest to the image in the first lens group G1 and the lens surface closest to the object in the second lens group G2 in the telephoto end state. When $ft \times L12t / |f1|$ is less than the lower limit of the conditional expression (3), it is unfavorable in that the lens surface closest to the image in the first lens group G1 and the lens surface closest to the object in the second lens group G2 may approach each other so as to come into contact with each other in the telephoto end state because of manufacturing errors. It is also unfavorable in that the Petzval sum increases, whereby field curvature and astigmatism are hard to correct at the same time in the intermediate focal length state. When $ft \times L12t / |f1|$ exceeds the upper limit of the conditional expression (3), on the other hand, it is unfavorable in that upper coma is hard to correct in the intermediate focal length state.

When the lower limit of the conditional expression (3) is 0.4 and/or its upper limit is 1.8, the present invention can exhibit its effects more favorably. When the lower limit of the conditional expression (3) is 0.6 and/or its upper limit is 1.6, the present invention can exhibit its effects at a maximum.

Letting Nn be the highest refractive index of materials of negative lenses included in the second lens group G2 at d-line, and Np be the lowest refractive index of materials of positive lenses included in the second lens group G2 at d-line, it is desirable for the zoom lens system ZL to satisfy the following conditional expression (4):

$$0.36 < Nn - Np < 0.80 \quad (4)$$

The conditional expression (4) is a condition for favorably correcting the curvature of the sagittal image surface in the wide-angle end state. In the zoom lens system ZL of negative preceding type shown here, an optical system improved over that of triplet or telephoto type having a positive refractive power as a whole is often used for the second lens group G2. It is necessary for this kind of optical system to appropriately select materials for negative and positive lenses in order to favorably correct off-axis aberrations in particular, and arrange the negative and positive lenses such that their aberrations cancel each other out. The conditional expression (4) defines an optimal range for the material selection.

When Nn−Np is less than the lower limit of the conditional expression (4), it is unfavorable in that the curvature of the sagittal image surface increases in the wide-angle end state, thereby lowering the image quality in marginal parts of pictures. When Nn−Np exceeds the upper limit of the conditional expression (4), on the other hand, it is unfavorable in that the Petzval sum increases remarkably, so that field curvature and astigmatism are hard to correct at the same time in the telephoto end state.

When the lower limit of the conditional expression (4) is 0.37 and/or its upper limit is 0.75, the present invention can exhibit its effects more favorably. When the lower limit of the conditional expression (4) is 0.4 and/or its upper limit is 0.7, the present invention can exhibit its effects at a maximum.

Letting Nn be the highest refractive index of materials of negative lenses included in the second lens group G2 at d-line, and νn be Abbe number of a material of a lens having the highest refractive index in materials of negative lenses included in the second lens group G2 at d-line, it is desirable for the zoom lens system ZL to satisfy the following conditional expression (5):

$$3.0 < Nn + 0.05 \times \nu n \quad (5)$$

The conditional expression (5) defines an appropriate range for the refractive index and Abbe number of a negative lens constituting the second lens group G2. When the zoom lens system ZL has a higher variable power ratio, so as to attain a longer focal length in the telephoto end state, axial chromatic aberration is hard to correct in the telephoto end state in particular. Therefore, an appropriate material must be selected in the second lens group G2 in the zoom lens system ZL having such a high variable power ratio shown here. When Nn+0.05×νn is less than the lower limit of the conditional expression (5), it is unfavorable in that axial chromatic aberration and differences in spherical aberration dependent on wavelength are hard to correct in the telephoto end state.

When the lower limit of the conditional expression (5) is 3.1, the present invention can exhibit its effects more favorably. When the lower limit of the conditional expression (5) is 3.2, the present invention can exhibit its effects at a maximum. Though the value of the right-hand side in the conditional expression (5) tends to become greater as the refractive index at d-line increases, materials of lenses can be selected within a range in which the zoom lens system ZL does not lose its performances.

Preferably, thus constructed zoom lens system ZL having a wide angle and a high variable power ratio has an F-number determining member S in the second lens group G2 and at least one positive lens positioned on the object side of the F-number determining member. Here, the F-number determining member S is a member, such as an aperture stop, for example, which determines the f number by limiting the diameter of a light beam passing through the whole zoom lens system ZL. Therefore, the F-number determining member S is not restricted to the aperture stop, but may be a lens frame which holds the zoom lens system ZL.

Since a luminous flux diverged by the first lens group G1 is incident on the second lens group G2 in a zoom lens system of negative preceding type, such as the zoom lens system ZL shown here, in general, it is necessary for the second lens group G2 to use an optical system which is resistant to brightness. When the power variable ratio of the zoom lens system ZL is enhanced, it is necessary for the second lens group G2 to yield a high telephoto ratio, so as to shift the principal point of the second lens group G2 to the object side, in order to secure a distance along the optical axis between the first lens group G1 and the second lens group G2 in the telephoto end state. For satisfying such a demand, it will be desirable if a lens having a positive refractive power is arranged on the object side of the second lens group G2. On the other hand, it is necessary for the second lens group G2 to arrange the F-number determining member at such a position as to minimize the fluctuation in off-axis aberration caused by varying power. From such a viewpoint, it will be desirable if the F-number determining member S is arranged as close to the image as possible.

Preferred from the foregoing viewpoints is a structure in which the F-number determining member S is arranged in the second lens group G2, while at least one positive lens (e.g., positive meniscus lens L21 in FIGS. 1A to 1C) is arranged on the object side of the F-number determining member S. Such a structure can suppress the fluctuation in off-axis aberration caused by varying power, while a sufficient telephoto ratio is imparted by the second lens group G2.

Figure 1B:
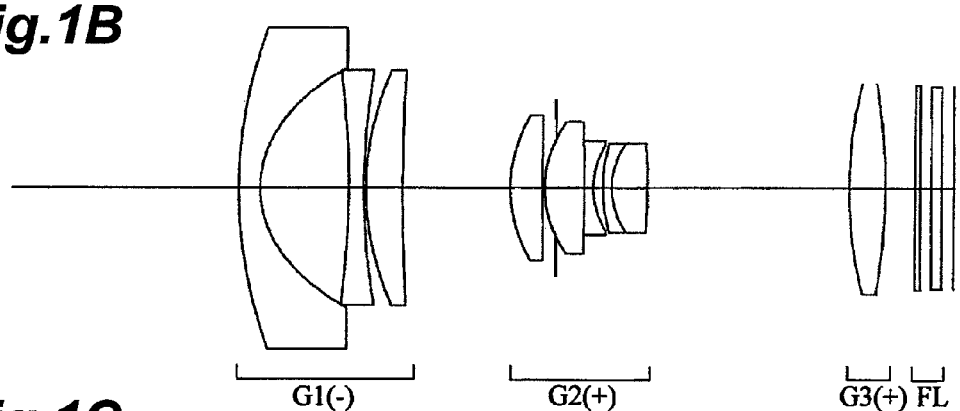
FIG. 1B is a lens configuration diagram showing the structure of the zoom lens system in accordance with Example 1 of the present invention.
Figure 1C:
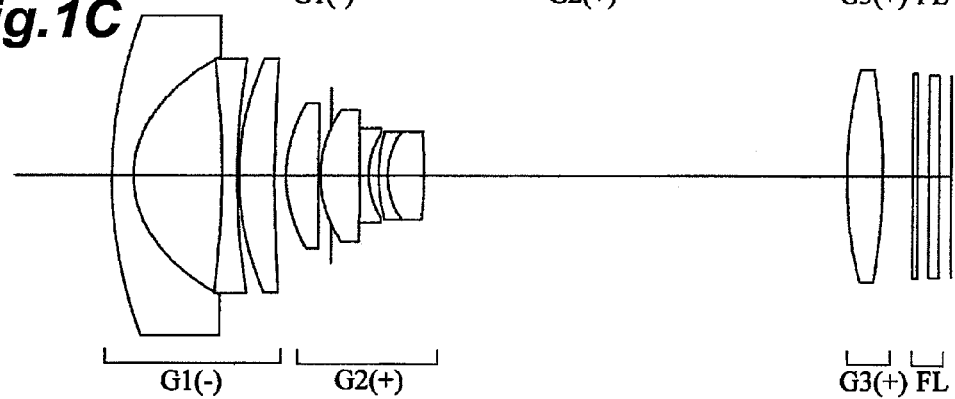
FIG. 1C is a lens configuration diagram showing the structure of the zoom lens system in accordance with Example 1 of the present invention.

Preferably, in thus constructed zoom lens system ZL, the second lens group G2 has, in order from the object along the optical axis, two positive lenses and one negative lens (e.g., the first positive lens, second positive lens, and one negative lens correspond to the positive meniscus lens L21, positive lens L22, and negative lens L23, respectively, in FIGS. 1A to 1C in order from the object). Arranging two positive lenses in series in order from the object and placing a negative lens on their image side is nothing but causing the three lenses to achieve a refractive power arrangement of telephoto type. Thus constructing the second lens group G2 can favorably correct spherical aberration, and prevent the first and second lens groups G1, G2 from coming into contact with each other in the telephoto end state even when the variable power ratio is further enhanced. Preferably, the second lens group G2 includes one or two negative lenses.

Preferably, in thus constructed zoom lens system ZL, the first lens group G1 is arranged such as to have, in order from the object along the optical axis, at least one negative meniscus lens and one positive lens. Thus constructing the first lens group G1 can favorably correct distortion in the wide-angle end state. Preferably, at least the image-side lens surface (e.g., surface No. 2 in FIGS. 1A to 1C) of the negative meniscus lens has an aspherical form. When the image-side lens surface is formed aspherical, the distortion in the wide-angle end state can be corrected more favorably.

In the zoom lens system ZL having such a wide angle and high variable power, focusing from an object at infinity to an object at a very close distance can be performed by moving the first lens group G1 or third lens group G3 toward the object. In this case, the focusing lens groups are employable for autofocusing and suitable for driving a motor (such as ultrasonic motor) for autofocusing. However, since moving the first lens group G1 tends to lower the image quality in marginal parts of pictures in close-up shots, moving the third lens group G3 toward the object is more desirable.

In the zoom lens system ZL having such a wide angle and high variable power, any of its lens surfaces may be a diffractive surface. Any lens may be a gradient-index lens (GRIN lens) or plastic lens. Additional lens groups may be provided on the image side of the third lens group G3 (though not depicted in FIGS. 1A to 1C).

The following features are appropriately employable within ranges in which optical performances are not lost.

First, though the above explanations and Examples which will follow illustrate the zoom lens system ZL having a three-group structure, the following structural conditions and the like are also applicable to other group structures such as those composed of four and five groups. For example, while the lens system is constructed by two movable groups, additional lens groups may be inserted between the existing lens groups or arranged adjacent thereto on the image side or object side. The lens groups refers to parts, separated from each other by an air space which varies at the time of varying power, each having at least one lens.

In order to prevent shooting from failing because of image blurs caused by camera shakes and the like which are likely to occur in a high variable power lens, the present invention can combine a shake detection system for detecting shakes of the lens system and driving means with the lens system and drive the whole or part of one of the lens groups constituting the lens system as a vibration reduction lens with the driving means such that the vibration reduction lens group is decentered so as to correct image blurs (fluctuations in the image surface position) due to shakes of the lens system detected by the shake detection system, thus shifting the image, thereby correcting the image blurs. It will be preferred in particular if the second lens group G2 is the vibration reduction lens group. Thus, the zoom lens system ZL in accordance with this embodiment can function as a so-called vibration reduction optical system.

The variable power optical system ZL may have aspherical lens surfaces. The aspherical surfaces may be any of those made by grinding, glass-molded aspherical surfaces in which glass is formed aspherical with molds, and composite aspherical surfaces in which a resin is formed aspherical on a surface of glass. On the other hand, the spherical or planar lens surfaces are favorable in that processing of lenses and adjustment of their assembling are easy, so as to prevent optical performances from deteriorating because of errors in the processing and adjustment of assembling. They are also favorable in that depicting performances deteriorate less even when the image surface is shifted.

When an antireflection coating exhibiting high transmittance over a broad wavelength range is applied to each lens surface, flares and ghosts can be reduced, so as to achieve high optical performances with a high contrast.

The present invention is explained with reference to constituent features of its embodiments for easier understanding, but is not limited thereto as a matter of course.

Figure 13:
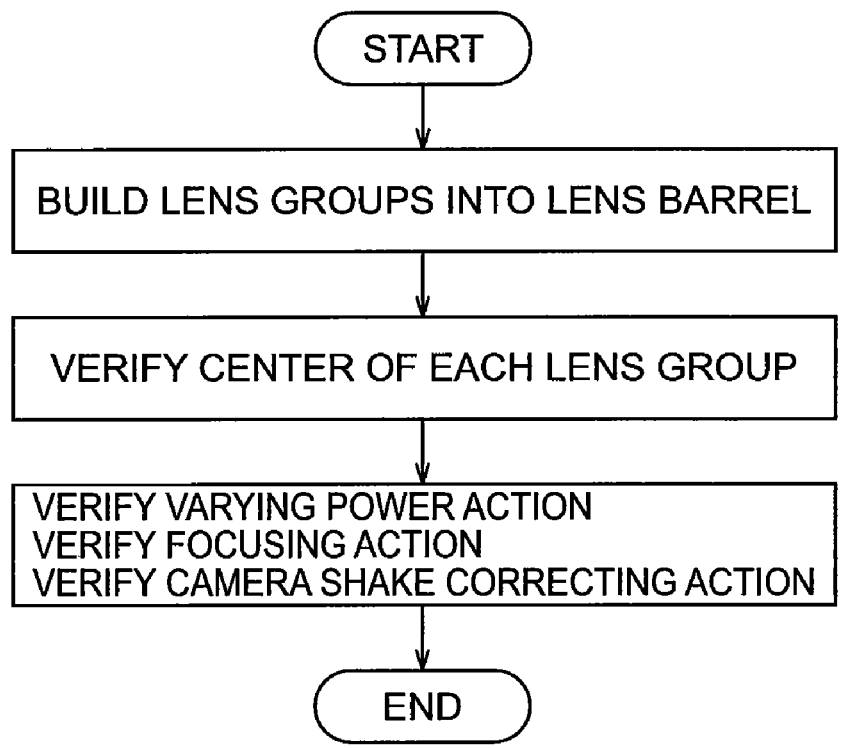
FIG. 13 is a flowchart showing a method of manufacturing the zoom lens system in accordance with the present invention.

An outline of a method of manufacturing the zoom lens system will now be explained with reference to FIG. 13.

To begin with, the first lens group G1, second lens group G2, and third lens group G3 of this embodiment are built into a cylindrical lens barrel. The lens groups may be built into the lens barrel one by one in their order along the optical axis, or a part or all of the lens groups may be integrally held with a holding member and then assembled with a lens barrel member. Preferably, after the lens groups are built into the lens barrel, whether or not an image of an object is formed in the state where the lens groups are built into the lens barrel is determined.

After the zoom lens system is assembled as mentioned above, its various actions are verified. Examples of the actions include a varying power action in which at least a part of lens groups moves along the optical axis when varying power, a focusing action in which a lens group for focusing from an object at infinity to an object at a close distance moves along the optical axis, and a camera shake correcting action in which at least a part of lenses moves so as to have a component orthogonal to the optical axis. When varying power from the wide-angle end state to the telephoto end state in this embodiment, at least the first and second lens groups G1, G2 move such as to decrease the distance between the first lens group G1 and the second lens group G2 and increase the distance between the second lens group G2 and the third lens group G3. The various actions can be verified in any order.

Figure 11A:
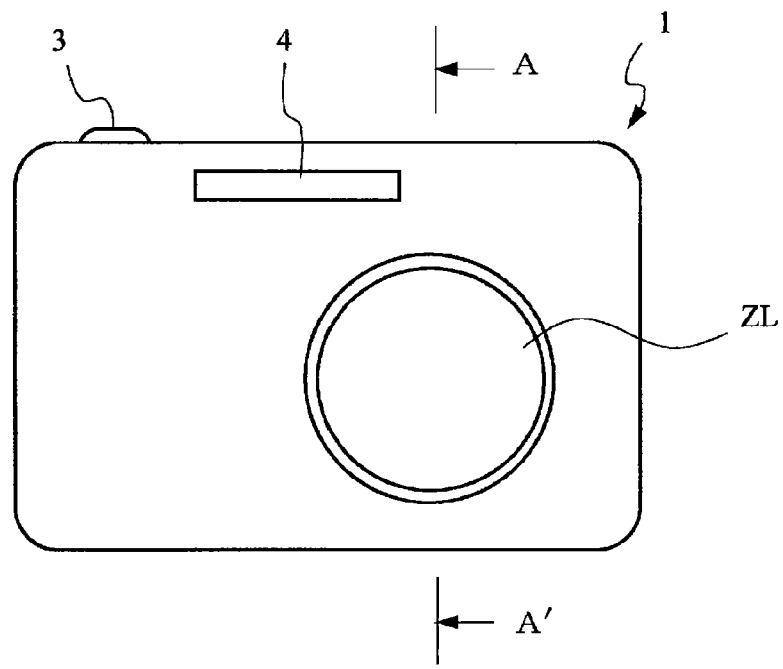
FIG. 11A is a front view of an electronic still camera mounted with the zoom lens system in accordance with the present invention.
Figure 11B:
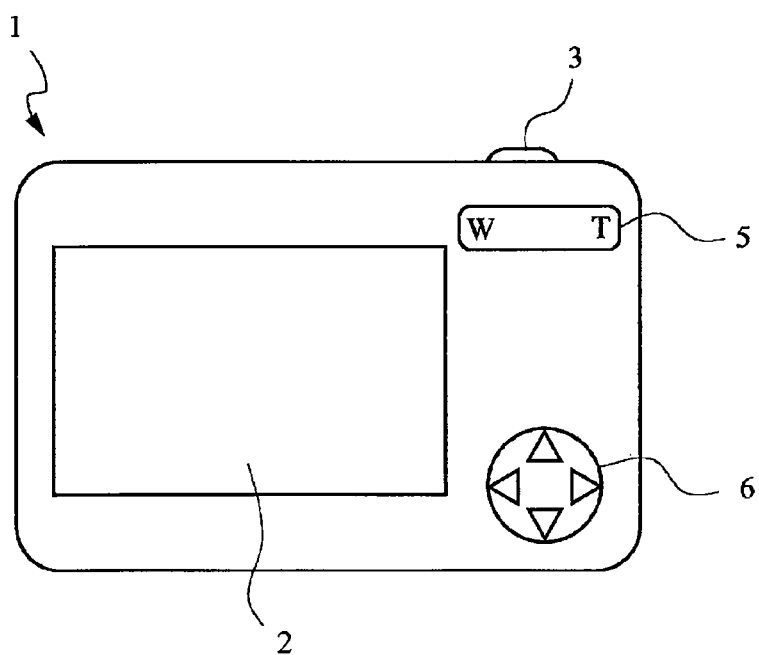
FIG. 11B is a rear view of the electronic still camera mounted with the zoom lens system in accordance with the present invention.
Figure 12:
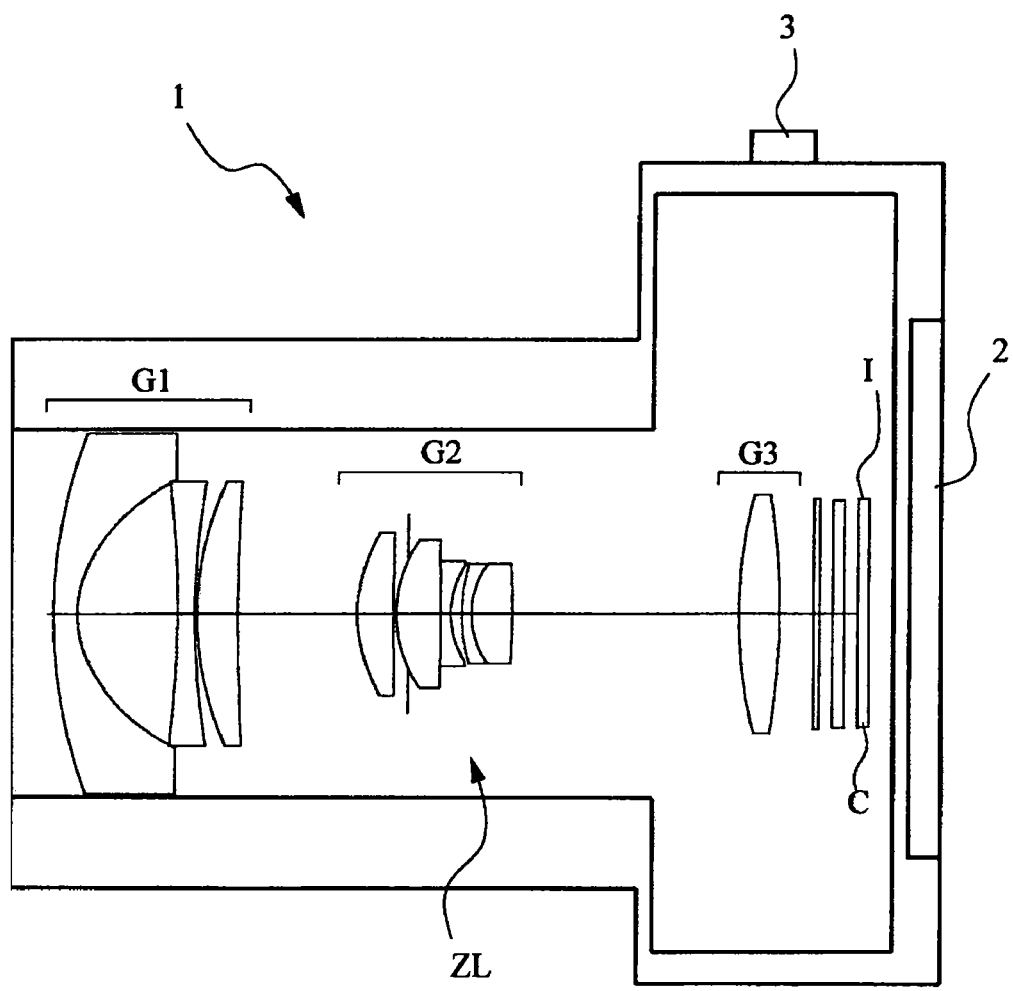
FIG. 12 is a sectional view taken along the line A-A' of FIG. 11A.

FIGS. 11A, 11B and 12 show the structure of an electronic still camera (hereinafter simply referred to as camera) 1 as an optical device equipped with the above-mentioned zoom lens system ZL. When an undepicted power button is pressed in this camera 1, an undepicted shutter of its shooting lens system (zoom lens system ZL) is released, so that light from an object is converged by the zoom lens system ZL, so as to form an image on an imaging device C (e.g., CCD or CMOS) arranged at an image surface I. The object image formed on the imaging device C is displayed on a liquid crystal monitor 2 arranged behind the camera 1. After deciding a composition of the object image while viewing the liquid crystal monitor 2, a photographer pushes down a release button, so as to capture the object image with the imaging device C and record it into an undepicted memory for storage.

Arranged in the camera 1 are an auxiliary light emitting part 4 for emitting auxiliary light when the object is dark, a wide (W)-telephoto (T) button 5 for zooming the zoom lens system ZL from the wide-angle end state (W) to the telephoto end state (T), a function button 6 used for setting various conditions and the like of the camera 1, and the like.

EXAMPLES

Examples of the present invention will now be explained with reference to the accompanying drawings. FIGS. 1A to 1C show the refractive power distribution of the zoom lens system ZL and how its lens groups move when the focal length state changes from the wide-angle end state (FIG. 1A) to the telephoto end state (FIG. 1C) by way of the intermediate focal length state (FIG. 1B). As shown in FIGS. 1A to 1C, the depicted zoom lens system ZL has, in order from the object, the first lens group G1 having a negative refractive power as a whole, the second lens group G2 having a positive refractive power as a whole, and the third lens group G3 having a positive refractive power as a whole, and is constructed such that, when varying power from the wide-angle end state to the telephoto end state, the first and second lens groups G1, G2 move so as to decrease the distance between the first lens group G1 and the second lens group G2 and increase the distance between the second lens group G2 and the third lens group G3 in the state where the third lens group G3 is stationary.

Example 1

FIGS. 1A to 1C shows the structure of the zoom lens system ZL1 in accordance with Example 1 of the present invention. In the zoom lens system ZL1 of FIGS. 1A to 1C, the first lens group G1 is composed of, in order from the object along the optical axis, a negative meniscus lens L11 having a convex surface facing the object, a double concave negative lens L12, and a positive meniscus lens L13 having a convex surface facing the object, while the image-side surface of the negative meniscus lens L11 (surface No. 2) is formed aspherical. The second lens group G2 is composed of, in order from the object along the optical axis, a positive meniscus lens L21 having a convex surface facing the object, a cemented lens constructed by cementing a double convex positive lens L22 and a double concave negative lens L23 together, and a cemented lens constructed by cementing a negative meniscus lens L24 having a convex surface facing the object and a double convex positive lens L25 together, while the object-side lens surface of the positive meniscus lens L21 (surface No. 7) is formed aspherical. The third lens group G3 is constructed by a double convex positive lens L31 alone. The F-number determining member S is arranged on the image side of the vertex on the optical axis of the positive lens L22 in the second lens group G2 and moves together with the second lens group G2 when varying power from the wide-angle end state to the telephoto end state. A filter group FL is constructed by a low-pass filter, an infrared cut filter, and the like.

The following Table 1 lists values of data in Example 1. In Table 1, f, FNO, 2ω, and Ymax in "Specifications" denote the focal length, F-number, angle of view, and maximum image height, respectively. In "Lens Data", the surface number in the first column, the radius of curvature in the second column, the surface distance in the third column, the fourth column, and the fifth column list the lens surface number counted in order from the object side, the radius of curvature of each lens surface, the distance along the optical axis from each optical surface to the next optical surface, Abbe number, and the refractive index at d-line (λ=587.6 nm), respectively. The asterisk on the left side in the first column indicates that the lens surface is an aspherical surface. BT refers to back focus.

Here, letting y be the height perpendicular to the optical axis, x be the distance (sag amount) along the optical axis from the tangent plane at the vertex of the aspherical surface to the aspherical surface at the height y, R be the radius of paraxial curvature (radius of curvature of a reference aspherical surface), κ be the conical constant, and An be the nth-order aspherical coefficient, the aspherical surface is represented by the following expression (a):

$$S(y) = \frac{\left(\frac{y^2}{R}\right)}{\left[1 + \left(\frac{1 - \kappa y^2}{R^2}\right)^{1/2}\right]} + A4y^4 + A6y^6 + A8y^8 + A10y^{10} \quad (a)$$

"Variable Distance Data" lists values of focal lengths and variable distances in the wide-angle end, intermediate focal length, and telephoto end states, while "Group Focal Lengths" lists the respective focal lengths of the lens groups. "Values for Conditional Expressions" lists values of parameters in the conditional expressions. Here, TL, f1, f2, and f3 denote the total length of the zoom lens system ZL, the focal length of the first lens group G1, the focal length of the second lens group G2, and the focal length of the third lens group G3, respectively. The same symbols as those of this example will be used in data of all the following examples.

While "mm" is generally used for the unit of lengths such as focal length, radius of curvature, and surface distance in the data tables, the unit is not limited thereto, since optical systems can attain similar optical performances even after being proportionally enlarged or reduced. The refractive index of air, which is 1.000, is omitted in the tables. In the column of radius of curvature r in the tables, "∞" denotes a plane. In the column of aspherical data, "E-n" (where n is an integer) denotes "×10$^{-n}$". In the following tables, W, IFL, and T denote the Wide-angle end, Intermediate focal length, and Telephoto end, respectively. Also, s, r, d, n, and ν denote the Surface No., Radius of curvature, Surface distance, Refractive index, and Abbe number, respectively, in the following tables.

TABLE 1

[Specifications]

f = 4.33~17.19
FNO = 2.62~6.24
2ω = 86.48°~25.46°
Ymax = 3.9

[Lens Data]

| s | r | d | n | ν |
|---|---|---|---|---|
| 1 | 20.7601 | 1.0000 | 40.58 | 1.86400 |
| *2 | 4.7303 | 4.0500 | | |
| 3 | -42.4030 | 0.7000 | 65.47 | 1.60300 |
| 4 | 31.0000 | 0.1000 | | |
| 5 | 13.1113 | 1.6500 | 23.78 | 1.84666 |
| 6 | 83.9806 | (D1) | | |
| *7 | 6.1158 | 1.5000 | 45.46 | 1.80139 |
| 8 | 314.7297 | 0.6000 | | |
| 9 | ∞ | -0.5000 | (F-number determining member) | |
| 10 | 5.3018 | 1.8000 | 53.89 | 1.71300 |
| 11 | -129.8364 | 0.4000 | 28.27 | 2.00330 |
| 12 | 3.6195 | 0.4500 | | |
| 13 | 7.5387 | 0.4000 | 40.77 | 1.88300 |
| 14 | 3.4988 | 1.6500 | 58.89 | 1.51823 |
| 15 | -25.0532 | (D2) | | |
| 16 | 19.3224 | 1.6500 | 65.47 | 1.60300 |
| 17 | -29.0728 | (D3) | | |
| 18 | ∞ | 0.2500 | 64.12 | 1.51680 |
| 19 | ∞ | 0.5000 | | |
| 20 | ∞ | 0.5000 | 64.12 | 1.51680 |
| 21 | ∞ | (BF) | | |

[Aspherical Data]

(Surface No. 2)

κ = 0.1366
A4 = 4.15570E-04
A6 = 8.77820E-06
A8 = -7.94640E-08
A10 = 3.93770E-09

(Surface No. 7)

κ = 0.4618
A4 = 2.39200E-05
A6 = 0.00000E+00
A8 = 0.00000E+00
A10 = 0.00000E+00

[Variable Distance Data]

| | WES Infinity | IS Infinity | TES Infinity |
|---|---|---|---|
| f | 4.33 | 8.60 | 17.19 |
| D1 | 13.5732 | 4.8967 | 0.5000 |
| D2 | 4.1073 | 9.1468 | 19.2847 |
| D3 | 1.3736 | 1.3736 | 1.3736 |
| BF | 0.5242 | 0.5242 | 0.5242 |
| TL | 36.2783 | 32.6412 | 38.3825 |

[Group Focal Lengths]

f1 = -9.77
f2 = 9.45
f3 = 19.50

[Values for Conditional Expressions]

(1) Ymax × ft/f12 = 0.70235
(2) (N2nav − 0.8)ft · tanωw/TLw = 0.50937
(3) ft × L12t/|f1| = 0.87973

TABLE 1-continued (4) Nn − Np = 0.49272
(5) Nn + 0.05 × νn = 3.41680

Thus, the zoom lens system ZL1 in accordance with Example 1 is found to satisfy all the above-mentioned conditional expressions (1) to (5).

Figure 2A:
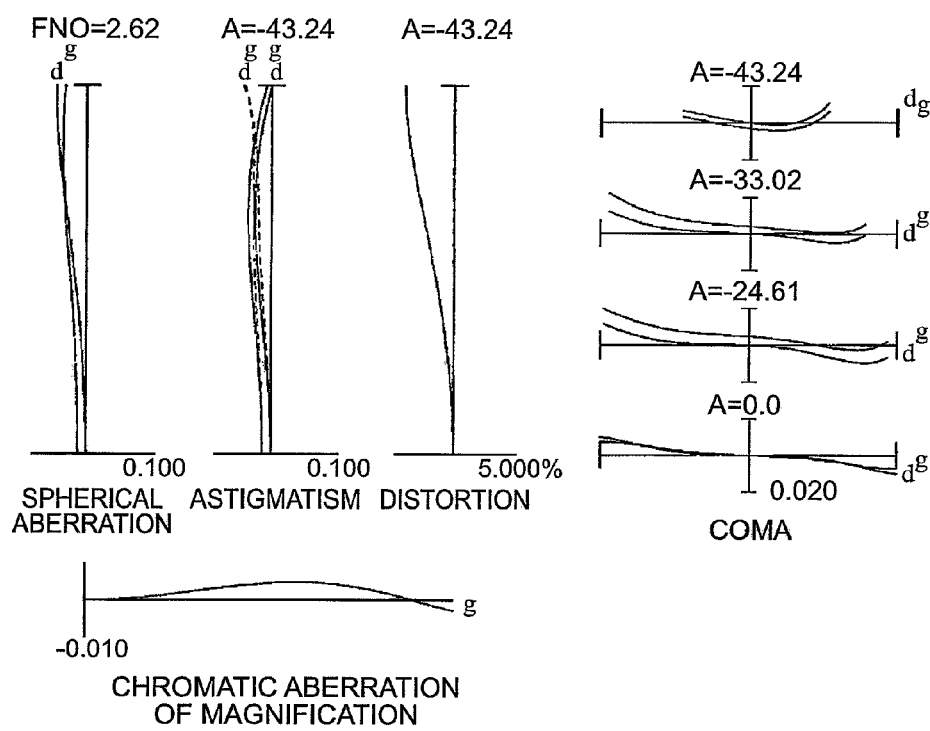
FIG. 2A is an aberration chart in Example 1 in the infinity in-focus state in the wide-angle end.
Figure 2B:
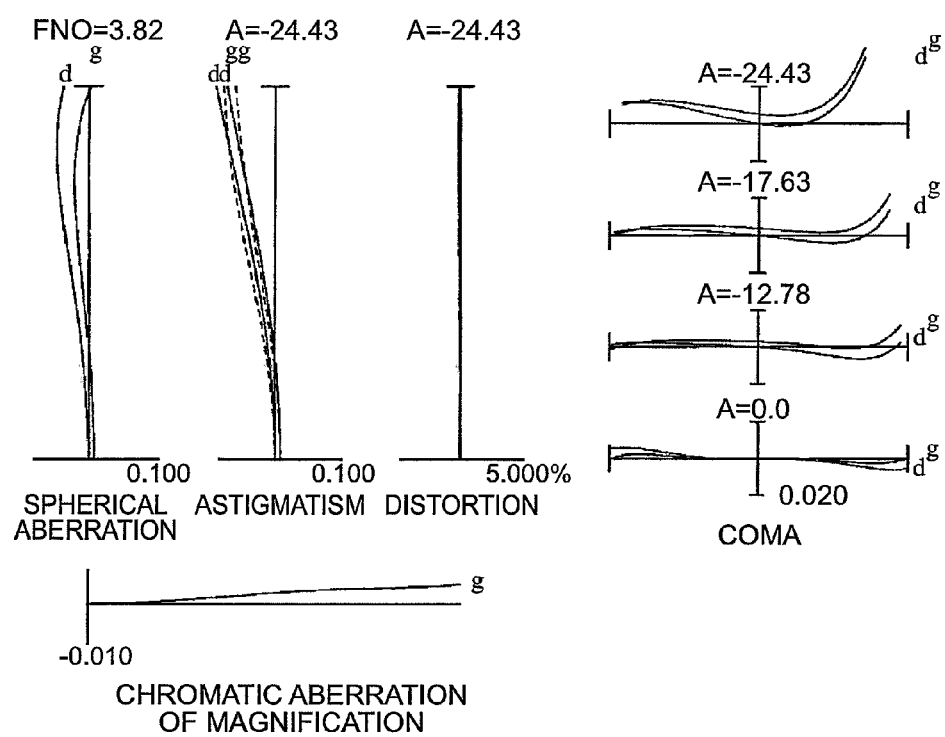
FIG. 2B is an aberration chart in Example 1 in the infinity in-focus state in the intermediate focal length.
Figure 2C:
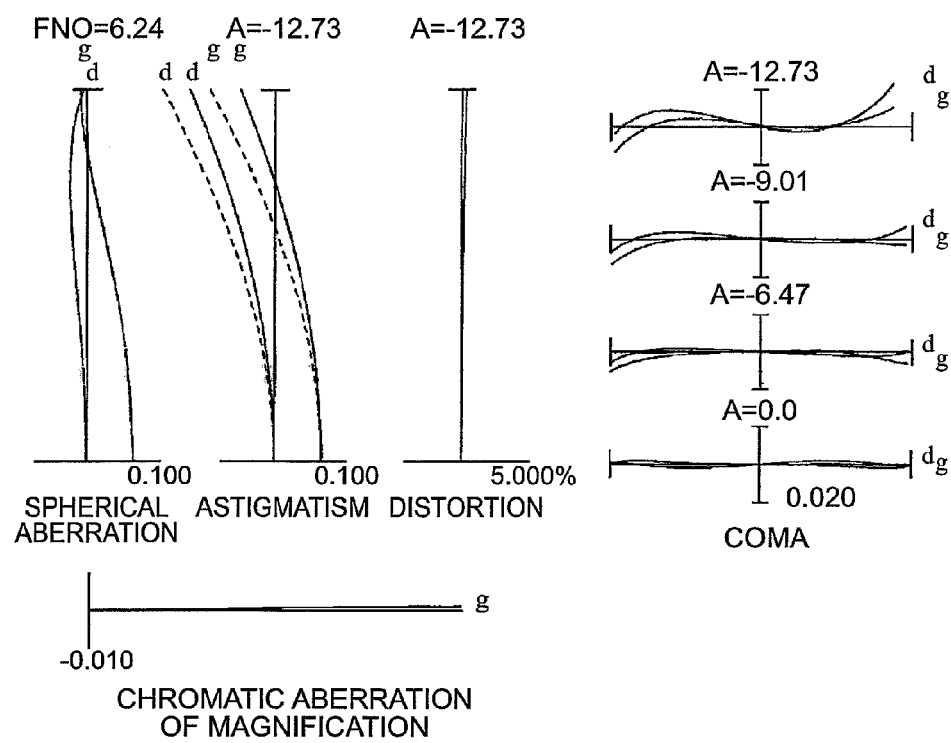
FIG. 2C is an aberration chart in Example 1 in the infinity in-focus state in the telephoto end states.

FIGS. 2A to 2C are aberration charts showing various aberrations in the zoom lens system ZL1 in accordance with Example 1 in the infinity in-focus state in the wide-angle end, intermediate focal length, and telephoto end states, respectively. In each aberration chart, FNO and A denote the F-number and the half angle of view, respectively. In each aberration chart, d and g denote aberration curves at d-line ($\lambda$=587.6 nm) and g-line ($\lambda$=435.8 nm), respectively. In each astigmatism chart, solid and broken lines indicate sagittal and meridional image surfaces, respectively. The same symbols as those of this example will be used in various aberration charts of the following examples. Thus, the aberration charts show that various aberrations are favorably corrected in each focal length state from the wide-angle end state to the telephoto end state, so that the zoom lens system ZL1 in accordance with Example 1 has excellent optical performances.

Example 2

Figure 3A:
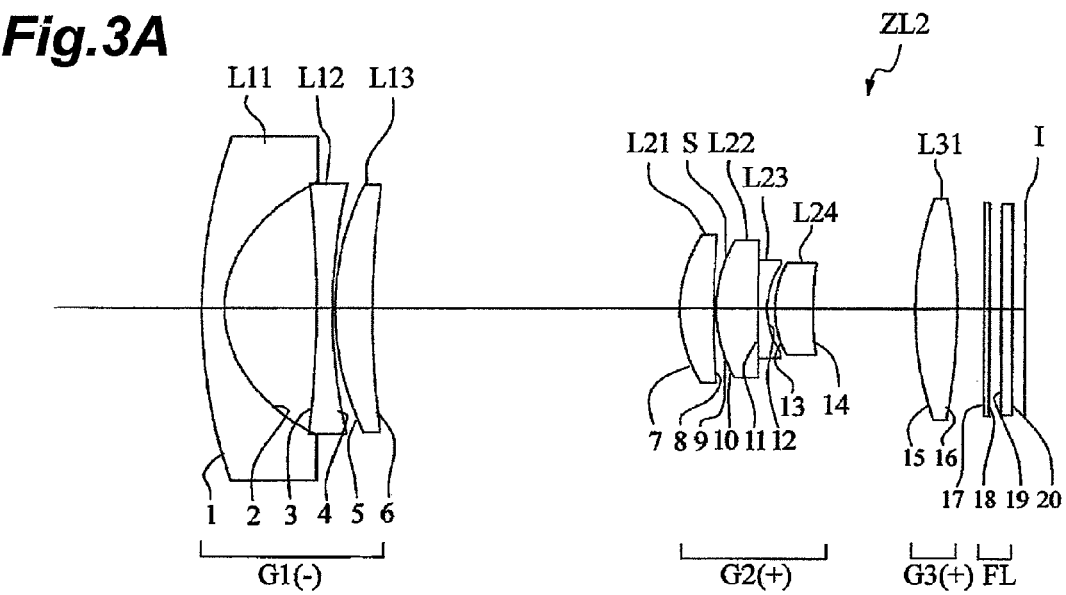
FIG. 3A is a lens configuration diagram showing the structure of the zoom lens system in accordance with Example 2 of the present invention.
Figure 3B:
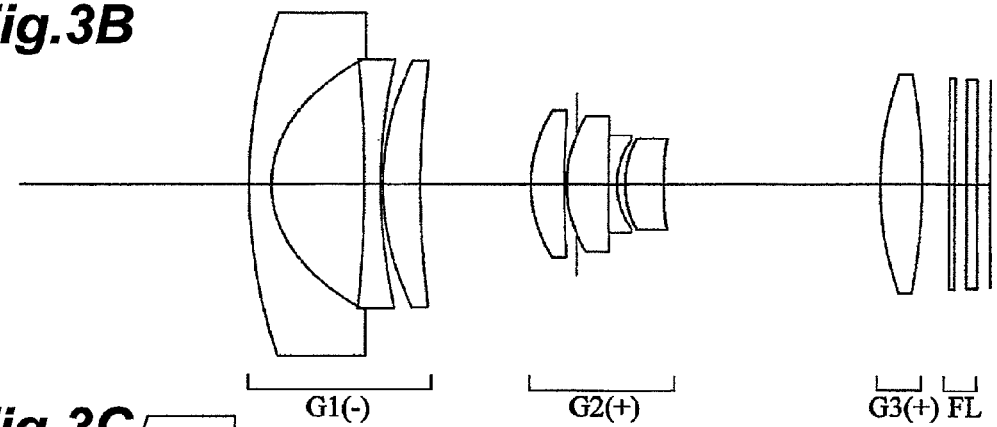
FIG. 3B is a lens configuration diagram showing the structure of the zoom lens system in accordance with Example 2 of the present invention.
Figure 3C:
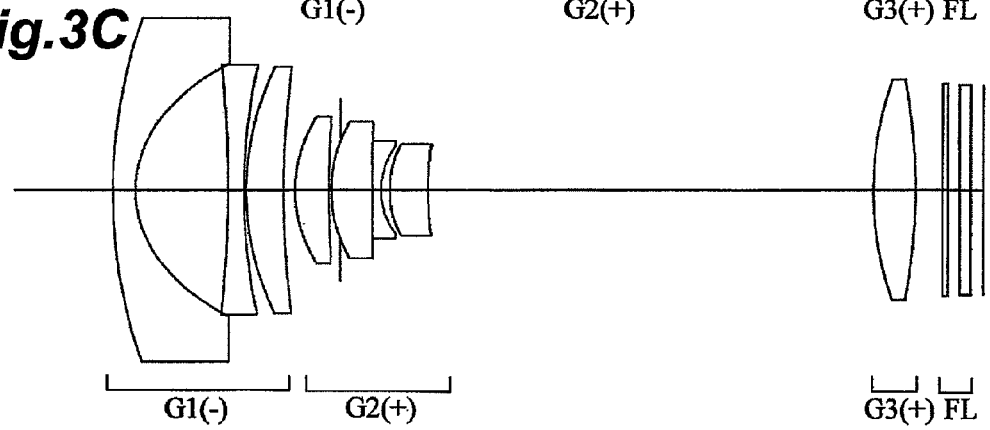
FIG. 3C is a lens configuration diagram showing the structure of the zoom lens system in accordance with Example 2 of the present invention.

FIGS. 3A to 3C shows the structure of the zoom lens system ZL2 in accordance with Example 2 of the present invention. In the zoom lens system ZL2 of FIGS. 3A to 3C, the first lens group G1 is composed of, in order from the object along the optical axis, a negative meniscus lens L11 having a convex surface facing the object, a double concave negative lens L12, and a positive meniscus lens L13 having a convex surface facing the object, while the image-side lens surface of the negative meniscus lens L11 (surface No. 2) is formed aspherical. The second lens group G2 is composed of, in order from the object along the optical axis, a positive meniscus lens L21 having a convex surface facing the object, a cemented lens constructed by cementing a positive meniscus lens L22 having a convex surface facing the object and a negative meniscus lens L23 having a convex surface facing the object together, and a positive meniscus lens L24 having a convex surface facing the object, while the object-side lens surface of the positive meniscus lens L21 (surface No. 7) and both surfaces of the positive meniscus lens L24 (surface Nos. 13 and 14) are formed aspherical. The third lens group G3 is constructed by a double convex positive lens L31 alone. The F-number determining member S is arranged on the image side of the vertex on the optical axis of the positive lens L22 in the second lens group G2 and moves together with the second lens group G2 when varying power from the wide-angle end state to the telephoto end state. The filter group FL is constructed by a low-pass filter, an infrared cut filter, and the like.

The following Table 2 lists values of data in Example 2.

TABLE 2

[Specifications]

f = 4.33~17.19
FNO = 2.64~6.21
2ω = 87.72°~25.46°
Ymax = 3.9

[Lens Data]

| s | r | d | n | ν |
|---|---|---|---|---|
| 1 | 23.1083 | 1.0000 | 42.71 | 1.82080 |
| *2 | 4.7853 | 4.1000 | | |
| 3 | −49.9918 | 0.7000 | 70.45 | 1.48749 |
| 4 | 24.8321 | 0.1000 | | |
| 5 | 12.2474 | 1.6500 | 23.78 | 1.84666 |
| 6 | 40.4933 | (D1) | | |
| *7 | 5.7928 | 1.5000 | 45.46 | 1.80139 |
| 8 | 51.9966 | 0.5000 | | |
| 9 | ∞ | −0.4000 | (F-number determining member) | |
| 10 | 6.0016 | 1.8000 | 50.24 | 1.71999 |
| 11 | 89.1648 | 0.4000 | 28.27 | 2.00330 |
| 12 | 3.3191 | 0.3700 | | |
| *13 | 4.7020 | 1.7000 | 82.56 | 1.49782 |
| *14 | 26.1703 | (D2) | | |
| 15 | 14.7916 | 1.8500 | 82.56 | 1.49782 |
| 16 | −27.0686 | (D3) | | |
| 17 | ∞ | 0.2500 | 64.12 | 1.51680 |
| 18 | ∞ | 0.5000 | | |
| 19 | ∞ | 0.5000 | 64.12 | 1.51680 |
| 20 | ∞ | (BF) | | |

[Aspherical Data]

(Surface No. 2)

$\kappa$ = 0.1617
A4 = 3.71800E−04
A6 = 8.85550E−06
A8 = −1.13210E−07
A10 = 4.46060E−09

(Surface No. 7)

$\kappa$ = 0.4618
A4 = 2.39200E−05
A6 = 0.00000E+00
A8 = 0.00000E+00
A10 = 0.00000E+00

(Surface No. 13)

$\kappa$ = 2.0956
A4 = 9.67830E−04
A6 = 1.18760E−04
A8 = 0.00000E+00
A10 = 0.00000E+00

(Surface No. 14)

$\kappa$ = 134.0788
A4 = 2.01020E−03
A6 = 2.24150E−04
A8 = −3.04060E−05
A10 = 0.00000E+00

[Variable Distance Data]

| | WES<br>Infinity | IS<br>Infinity | TES<br>Infinity |
|---|---|---|---|
| f | 4.33 | 8.60 | 17.19 |
| D1 | 13.5732 | 4.8966 | 0.5000 |
| D2 | 4.4992 | 9.5387 | 19.6767 |
| D3 | 1.1894 | 1.1894 | 1.1894 |

TABLE 2-continued

| | | | |
|---|---|---|---|
| BF | 0.5242 | 0.5242 | 0.5242 |
| TL | 36.3060 | 32.6689 | 38.4102 |

[Group Focal Lengths]

f1 = −9.77
f2 = 9.45
f3 = 19.50

[Values for Conditional Expressions]

(1) Ymax × ft/f12 = 0.70235
(2) (N2nav − 0.8)ft · tanωw/TLw = 0.54750
(3) ft × |L12t/f1| = 0.87973
(4) Nn − Np = 0.50548
(5) Nn + 0.05 × vn = 3.41680

Figure 4A:
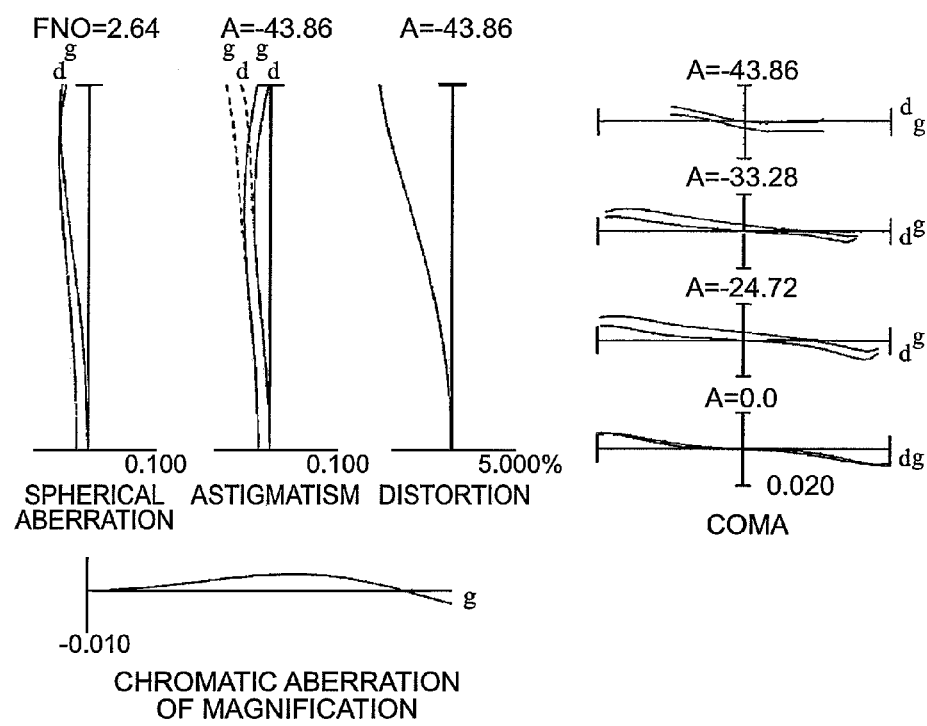
FIG. 4A is an aberration chart in Example 2 in the infinity in-focus state in the wide-angle end.
Figure 4B:
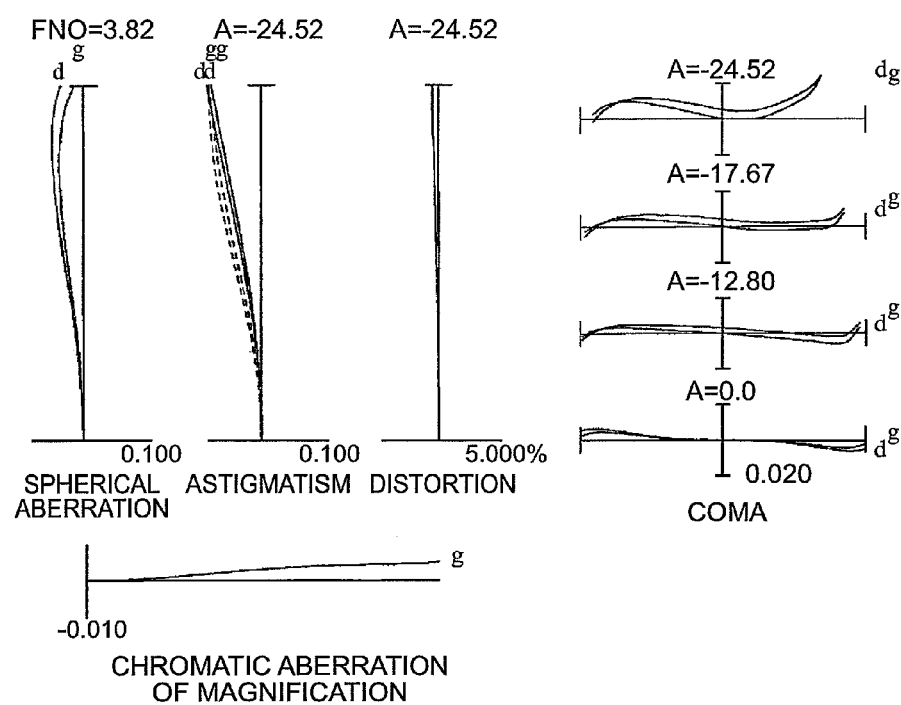
FIG. 4B is an aberration chart in Example 2 in the infinity in-focus state in the intermediate focal length.
Figure 4C:
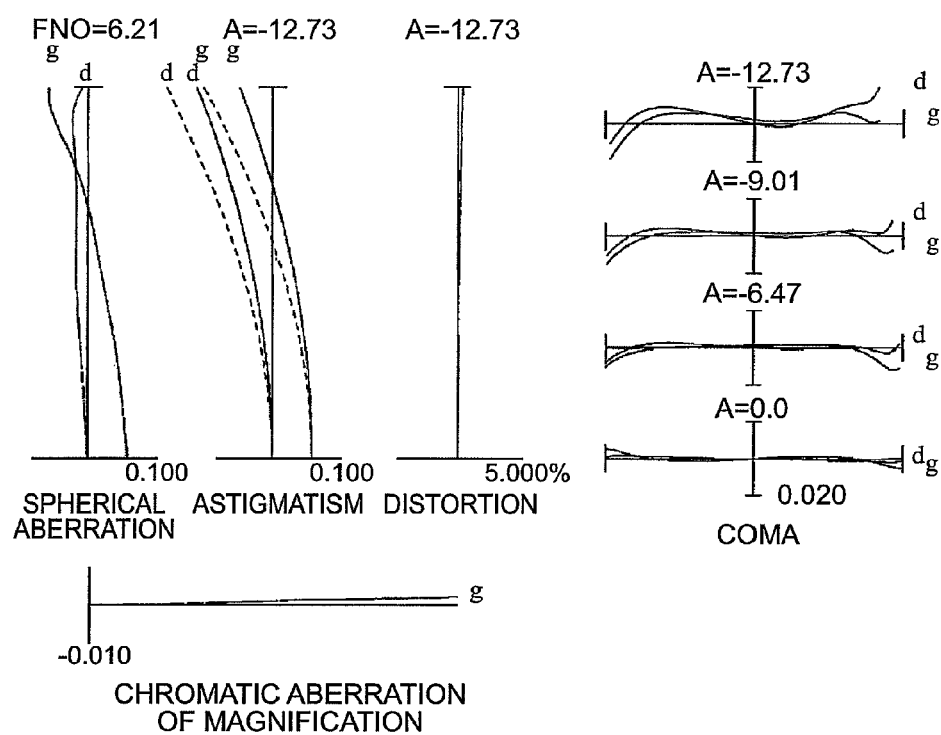
FIG. 4C is an aberration chart in Example 2 in the infinity in-focus state in the telephoto end states.

Thus, the zoom lens system ZL2 in accordance with Example 2 is found to satisfy all the above-mentioned conditional expressions (1) to (5). FIGS. 4A to 4C are aberration charts showing various aberrations in the zoom lens system ZL2 in accordance with Example 2 in the infinity in-focus state in the wide-angle end, intermediate focal length, and telephoto end states, respectively. The aberration charts show that various aberrations are favorably corrected in each focal length state from the wide-angle end state to the telephoto end state, so that the zoom lens system ZL2 in accordance with Example 2 has excellent optical performances.

Example 3

Figure 5A:
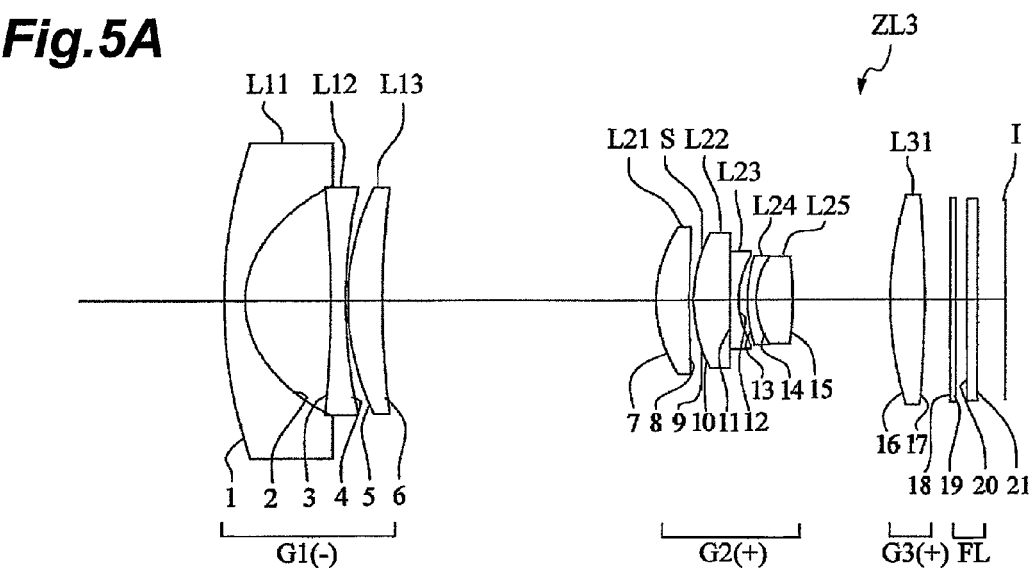
FIG. 5A is a lens configuration diagram showing the structure of the zoom lens system in accordance with Example 3 of the present invention.
Figure 5B:
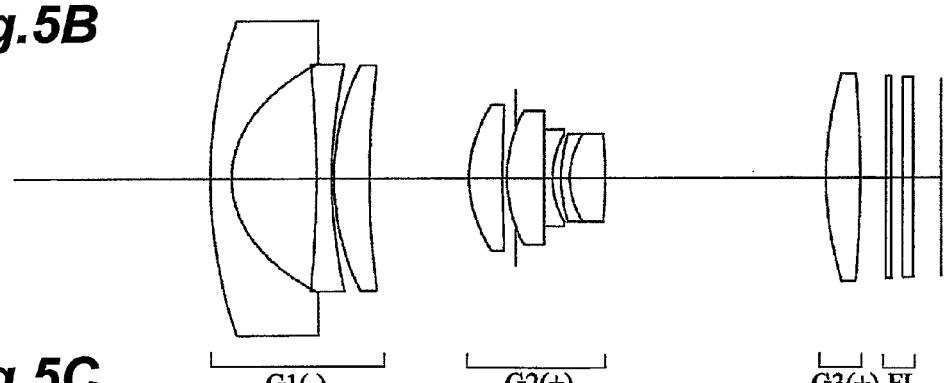
FIG. 5B is a lens configuration diagram showing the structure of the zoom lens system in accordance with Example 3 of the present invention.
Figure 5C:
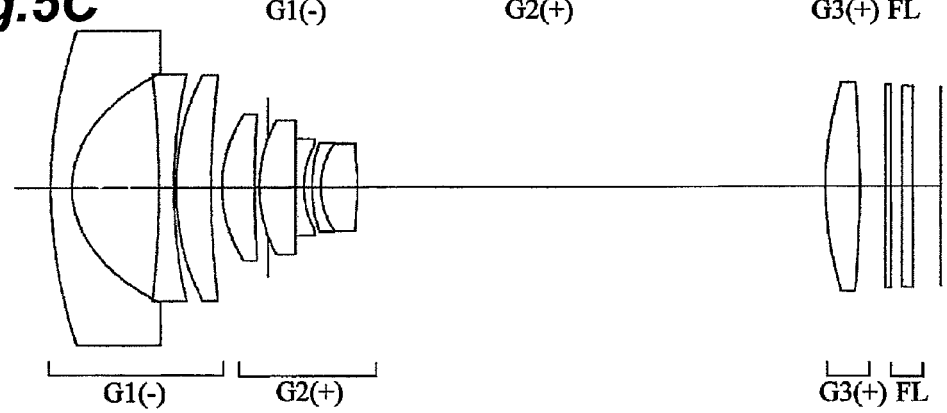
FIG. 5C is a lens configuration diagram showing the structure of the zoom lens system in accordance with Example 3 of the present invention.

FIGS. 5A to 5C show the structure of the zoom lens system ZL3 in accordance with Example 3 of the present invention. In the zoom lens system ZL3 of FIGS. 5A to 5C, the first lens group G1 is composed of, in order from the object along the optical axis, a negative meniscus lens L11 having a convex surface facing the object, a double concave negative lens L12, and a positive meniscus lens L13 having a convex surface facing the object, while the image-side lens surface of the negative meniscus lens L11 (surface No. 2) is formed aspherical. The second lens group G2 is composed of, in order from the object along the optical axis, a positive meniscus lens L21 having a convex surface facing the object, a cemented lens constructed by cementing a positive meniscus lens L22 having a convex surface facing the object and a negative meniscus lens L23 having a convex surface facing the object together, and a cemented lens constructed by cementing a negative meniscus lens L24 having a convex surface facing the object and a double convex positive lens L25 together, while the object-side lens surface of the positive meniscus lens L21 (surface No. 7) is formed aspherical. The third lens group G3 is constructed by a double convex positive lens L31 alone. The F-number determining member S is arranged on the image side of the vertex on the optical axis of the positive lens L22 in the second lens group G2 and moves together with the second lens group G2 when varying power from the wide-angle end state to the telephoto end state. The filter group FL is constructed by a low-pass filter, an infrared cut filter, and the like.

The following Table 3 lists values of data in Example 3.

TABLE 3

[Specifications]

f = 4.33~17.19
FNO = 2.56~6.14
2ω = 86.56°~25.44°
Ymax = 3.9

[Lens Data]

| s | r | d | n | ν |
|---|---|---|---|---|
| 1 | 22.4213 | 1.0000 | 45.46 | 1.80139 |
| *2 | 4.3737 | 4.0000 | | |
| 3 | −49.4891 | 0.7000 | 70.45 | 1.48749 |
| 4 | 23.3035 | 0.1000 | | |
| 5 | 11.7857 | 1.6500 | 23.78 | 1.84666 |
| 6 | 40.9541 | (D1) | | |
| *7 | 5.8535 | 1.5500 | 45.46 | 1.80139 |
| 8 | 57.7049 | 0.6000 | | |
| 9 | ∞ | −0.4000 | (F-number determining member) | |
| 10 | 6.5753 | 1.7000 | 53.89 | 1.71300 |
| 11 | −342.8658 | 0.4000 | 28.27 | 2.00330 |
| 12 | 4.1106 | 0.4000 | | |
| 13 | 6.8134 | 0.4000 | 40.77 | 1.88300 |
| 14 | 3.5914 | 1.7000 | 58.89 | 1.51823 |
| 15 | −17.6104 | (D2) | | |
| 16 | 16.3327 | 1.6000 | 65.47 | 1.60300 |
| 17 | −56.6611 | (D3) | | |
| 18 | ∞ | 0.2500 | 64.12 | 1.51680 |
| 19 | ∞ | 0.5000 | | |
| 20 | ∞ | 0.5000 | 64.12 | 1.51680 |
| 21 | ∞ | (BF) | | |

[Aspherical Data]

(Surface No. 2)

κ = 0.1697
A4 = 3.71090E−04
A6 = 1.02580E−05
A8 = −1.19600E−07
A10 = 5.08960E−09

(Surface No. 7)

κ = 0.4618
A4 = 2.39200E−05
A6 = 0.00000E+00
A8 = 0.00000E+00
A10 = 0.00000E+00

[Variable Distance Data]

| | WES Infinity | IS Infinity | TES Infinity |
|---|---|---|---|
| f | 4.33 | 8.60 | 17.19 |
| D1 | 12.6475 | 4.5853 | 0.5000 |
| D2 | 4.4871 | 10.2014 | 21.6969 |
| D3 | 1.2188 | 1.2188 | 1.2188 |
| BF | 1.2635 | 1.2635 | 1.2635 |
| TL | 36.2669 | 33.9190 | 41.3292 |

[Group Focal Lengths]

f1 = −9.07
f2 = 9.70
f3 = 21.20

[Values for Conditional Expressions]

(1) Ymax × ft/f12 = 0.81494
(2) (N2nav − 0.8)ft · tanωw/TLw = 0.51024
(3) ft × |L12t/f1| = 0.94763
(4) Nn − Np = 0.48507
(5) Nn + 0.05 × vn = 3.41680

Figure 6A:
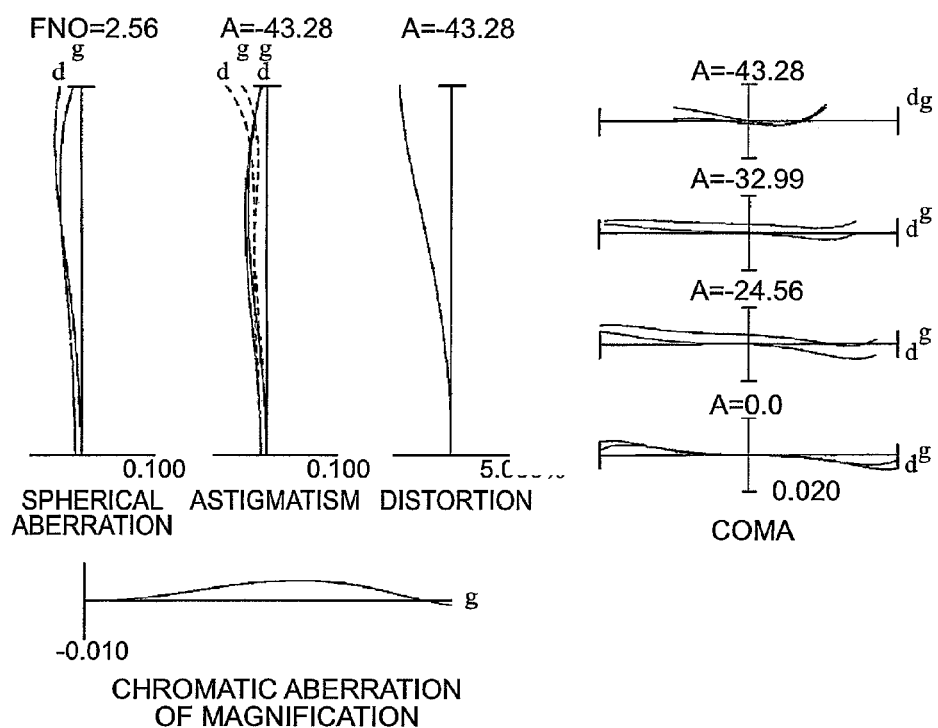
FIG. 6A is an aberration chart in Example 3 in the infinity in-focus state in the wide-angle end.
Figure 6B:
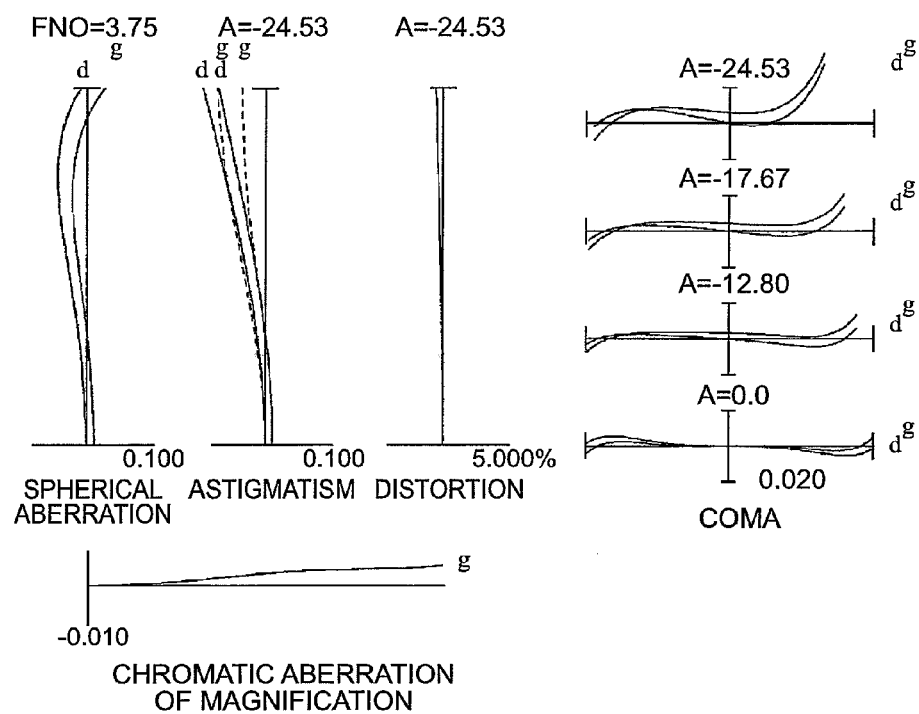
FIG. 6B is an aberration chart in Example 3 in the infinity in-focus state in the intermediate focal length.
Figure 6C:
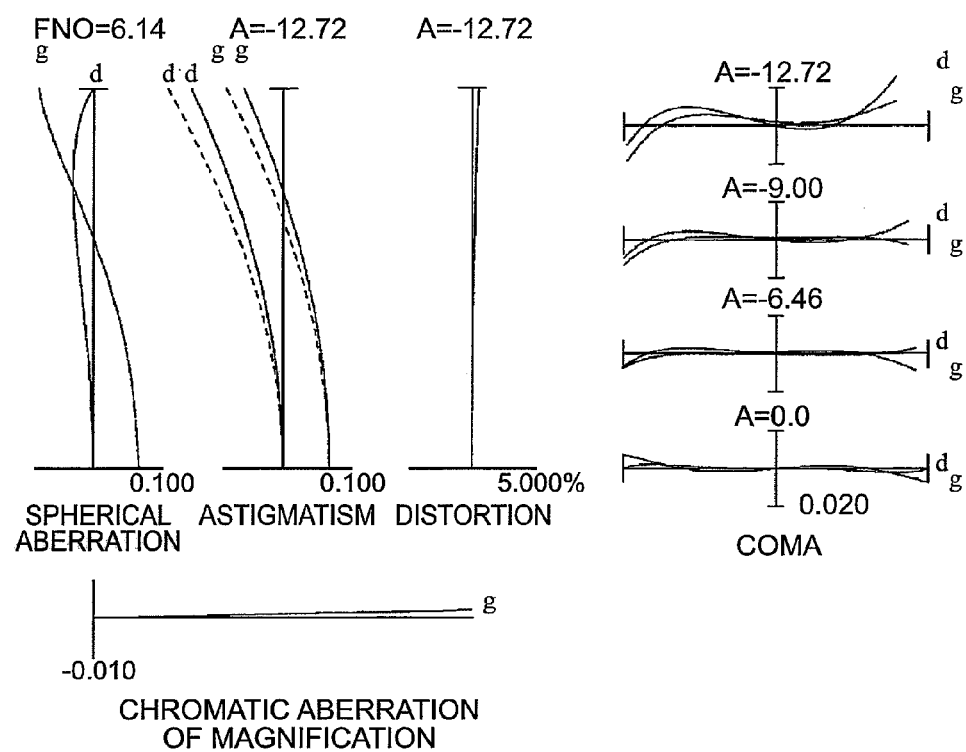
FIG. 6C is an aberration chart in Example 3 in the infinity in-focus state in the telephoto end states.

Thus, the zoom lens system ZL3 in accordance with Example 3 is found to satisfy all the above-mentioned conditional expressions (1) to (5). FIGS. 6A to 6C are aberration charts showing various aberrations in the zoom lens system ZL3 in accordance with Example 3 in the infinity in-focus state in the wide-angle end, intermediate focal length, and telephoto end states, respectively. The aberration charts show that various aberrations are favorably corrected in each focal length state from the wide-angle end state to the telephoto end state, so that the zoom lens system ZL3 in accordance with Example 3 has excellent optical performances.

Example 4

Figure 7A:
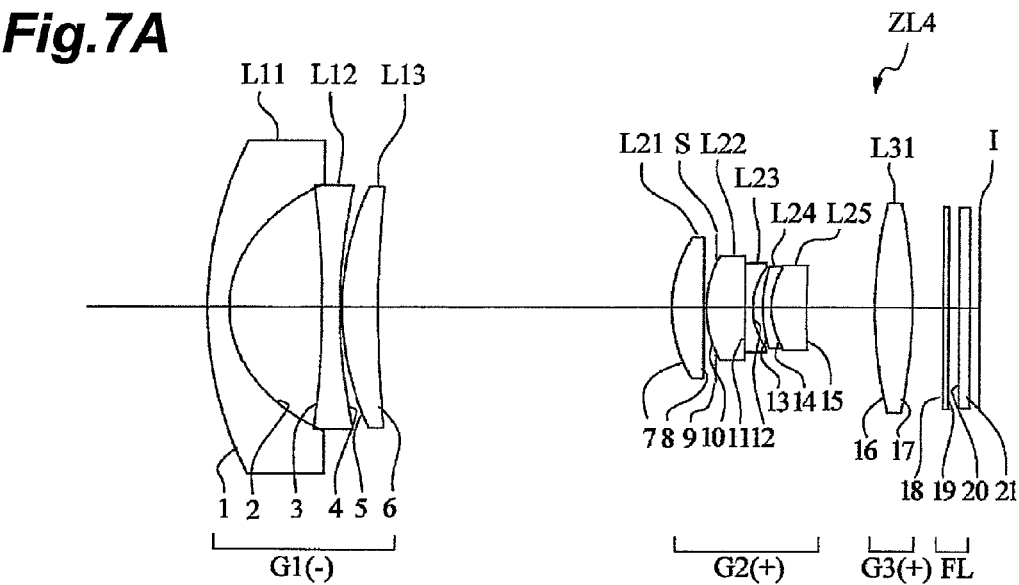
FIG. 7A is a lens configuration diagram showing the structure of the zoom lens system in accordance with Example 4 of the present invention.
Figure 7B:
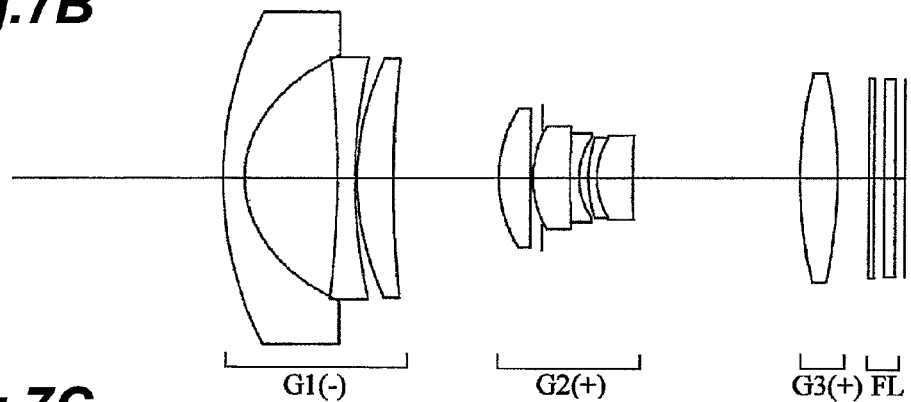
FIG. 7B is a lens configuration diagram showing the structure of the zoom lens system in accordance with Example 4 of the present invention.
Figure 7C:
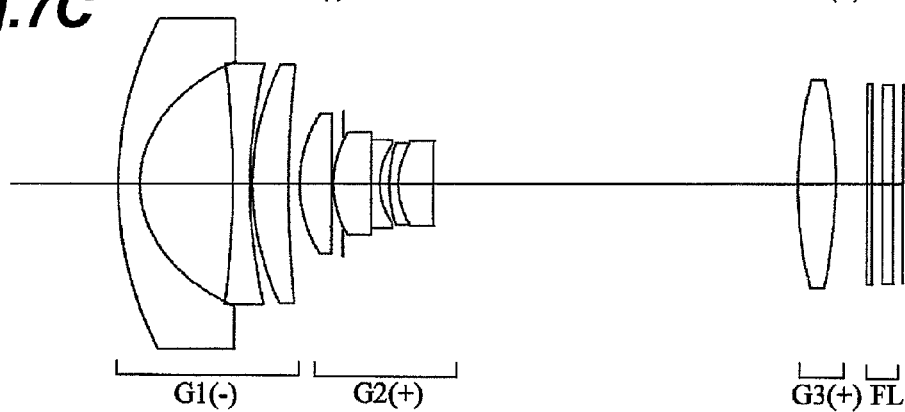
FIG. 7C is a lens configuration diagram showing the structure of the zoom lens system in accordance with Example 4 of the present invention.

FIGS. 7A to 7C show the structure of the zoom lens system ZL4 in accordance with Example 4 of the present invention. In the zoom lens system ZL4 of FIGS. 7A to 7C, the first lens group G1 is composed of, in order from the object along the optical axis, a negative meniscus lens L11 having a convex surface facing the object, a double concave negative lens L12, and a positive meniscus lens L13 having a convex surface facing the object, while the image-side lens surface of the negative meniscus lens L11 (surface No. 2) is formed aspherical. The second lens group G2 is composed of, in order from the object along the optical axis, a double convex positive lens L21, a cemented lens constructed by cementing a positive meniscus lens L22 having a convex surface facing the object and a negative meniscus lens L23 having a convex surface facing the object together, and a cemented lens constructed by cementing a negative meniscus lens L24 having a convex surface facing the object and a positive meniscus lens L25 having a convex surface facing the object together, while the object-side lens surface of the positive meniscus lens L21 (surface No. 7) is formed aspherical. The third lens group G3 is constructed by a double convex positive lens L31 alone. The F-number determining member S is arranged on the image side of the vertex on the optical axis of the positive lens L22 in the second lens group G2 and moves together with the second lens group G2 when varying power from the wide-angle end state to the telephoto end state. The filter group FL is constructed by a low-pass filter, an infrared cut filter, and the like.

The following Table 4 lists values of data in Example 4.

TABLE 4

[Specifications]

f = 4.33~17.19
FNO = 2.62~6.24
2ω = 86.46°~25.48°
Ymax = 3.9

[Lens Data]

| s | r | d | n | ν |
|---|---|---|---|---|
| 1 | 17.1360 | 1.0000 | 45.46 | 1.80139 |
| *2 | 5.0052 | 4.3500 | | |
| 3 | −44.2805 | 0.8000 | 70.45 | 1.48749 |
| 4 | 25.1325 | 0.1000 | | |
| 5 | 12.8572 | 1.7000 | 23.78 | 1.84666 |
| 6 | 56.3912 | (D1) | | |
| *7 | 5.8812 | 1.5000 | 45.46 | 1.80139 |
| 8 | −723.7204 | 0.5500 | | |
| 9 | ∞ | −0.4500 | (F-number determining member) | |
| 10 | 4.7935 | 1.7500 | 53.89 | 1.71300 |
| 11 | 138.4740 | 0.4000 | 28.27 | 2.00330 |
| 12 | 3.1719 | 0.4500 | | |
| 13 | 6.3209 | 0.4000 | 40.77 | 1.88300 |
| 14 | 3.5928 | 1.6500 | 58.89 | 1.51823 |
| 15 | 80.8234 | (D2) | | |
| 16 | 20.9852 | 1.7500 | 65.47 | 1.60300 |
| 17 | −22.5426 | (D3) | | |
| 18 | ∞ | 0.2500 | 64.12 | 1.51680 |
| 19 | ∞ | 0.5000 | | |
| 20 | ∞ | 0.5000 | 64.12 | 1.51680 |
| 21 | ∞ | (BF) | | |

[Aspherical Data]

(Surface No. 2)

κ = 0.2500
A4 = 3.43100E−04
A6 = 9.40030E−06
A8 = −1.33710E−07
A10 = 6.36790E−09

(Surface No. 7)

κ = 0.4618
A4 = 2.39200E−05
A6 = 0.00000E+00
A8 = 0.00000E+00
A10 = 0.00000E+00

[Variable Distance Data]

| | WES Infinity | IS Infinity | TES Infinity |
|---|---|---|---|
| f | 4.33 | 8.60 | 17.19 |
| D1 | 13.7516 | 4.9567 | 0.5000 |
| D2 | 3.1758 | 7.7860 | 17.0604 |
| D3 | 1.4473 | 1.4473 | 1.4473 |
| BF | 0.4533 | 0.4533 | 0.4533 |
| TL | 36.0280 | 31.8432 | 36.6609 |

[Group Focal Lengths]

f1 = −10.40
f2 = 9.10
f3 = 18.30

[Values for Conditional Expressions]

(1) Ymax × ft/f12 = 0.61983
(2) (N2nav − 0.8)ft · tanωw/TLw = 0.53971
(3) ft × L12t/|f1| = 0.82644
(4) Nn − Np = 0.42829
(5) Nn + 0.05 × νn = 3.41680

Figure 8A:
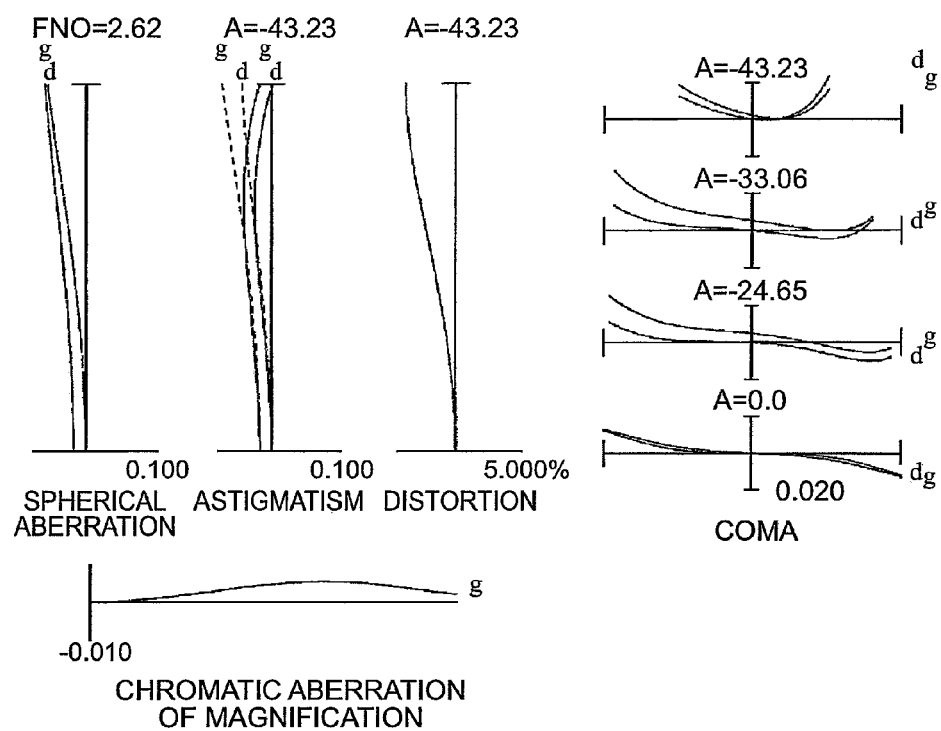
FIG. 8A is an aberration chart in Example 4 in the infinity in-focus state in the wide-angle end.
Figure 8B:
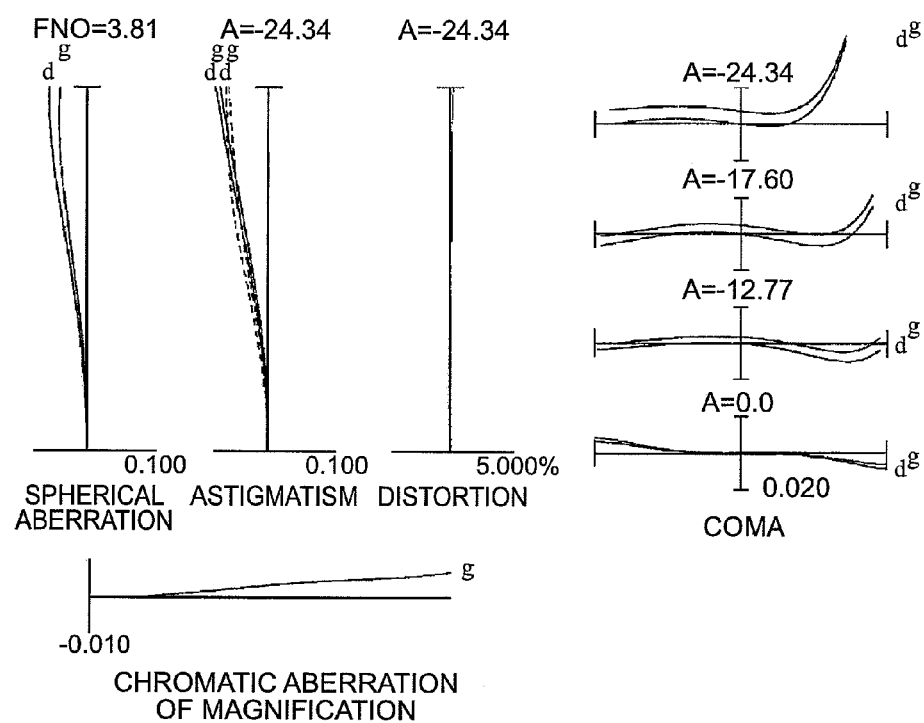
FIG. 8B is an aberration chart in Example 4 in the infinity in-focus state in the intermediate focal length.
Figure 8C:
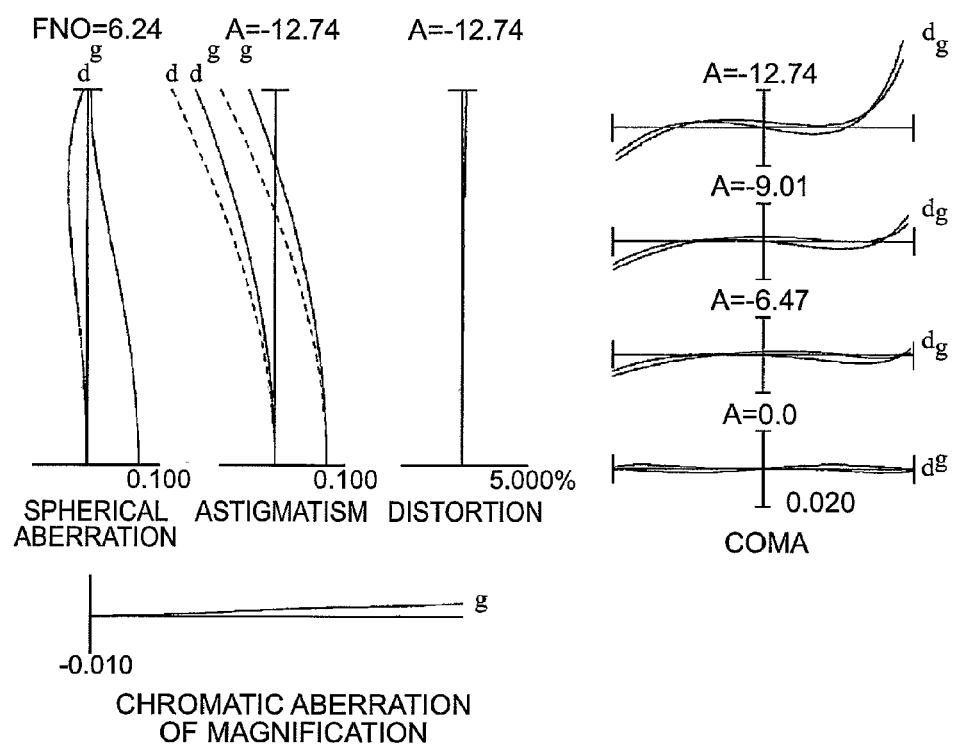
FIG. 8C is an aberration chart in Example 4 in the infinity in-focus state in the telephoto end states.

Thus, the zoom lens system ZL4 in accordance with Example 4 is found to satisfy all the above-mentioned conditional expressions (1) to (5). FIGS. 8A to 8C are aberration charts showing various aberrations in the zoom lens system ZL4 in accordance with Example 4 in the infinity in-focus state in the wide-angle end, intermediate focal length, and telephoto end states, respectively. The aberration charts show that various aberrations are favorably corrected in each focal length state from the wide-angle end state to the telephoto end state, so that the zoom lens system ZL4 in accordance with Example 4 has excellent optical performances.

Example 5

Figure 9A:
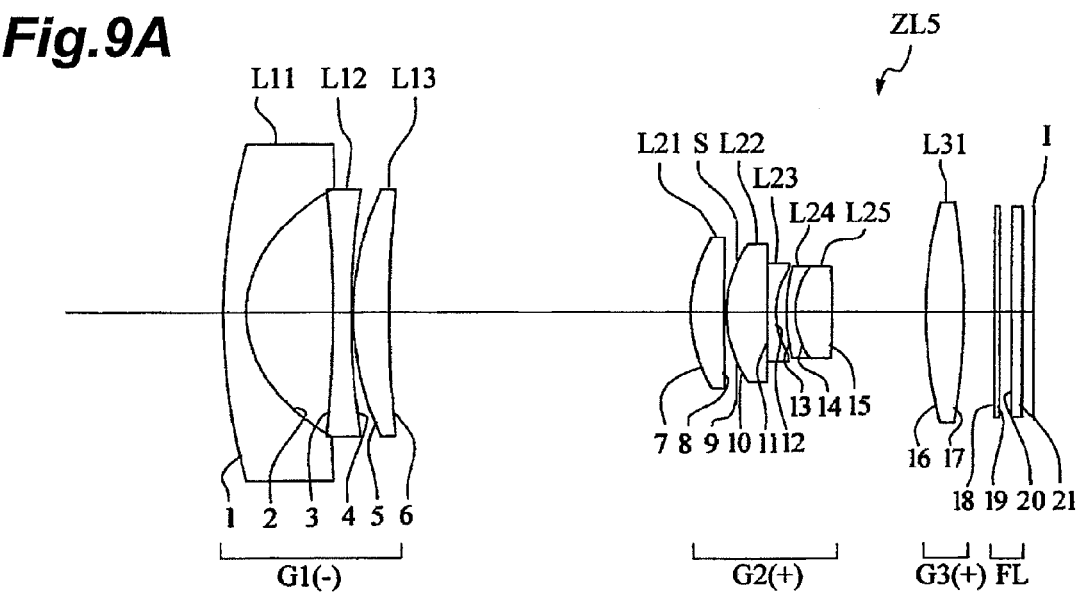
FIG. 9A is a lens configuration diagram showing the structure of the zoom lens system in accordance with Example 5 of the present invention.
Figure 9B:
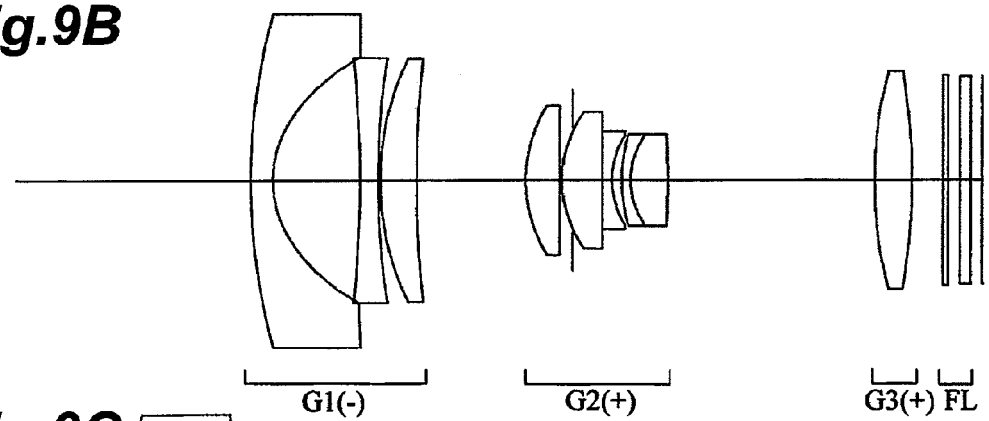
FIG. 9B is a lens configuration diagram showing the structure of the zoom lens system in accordance with Example 5 of the present invention.
Figure 9C:
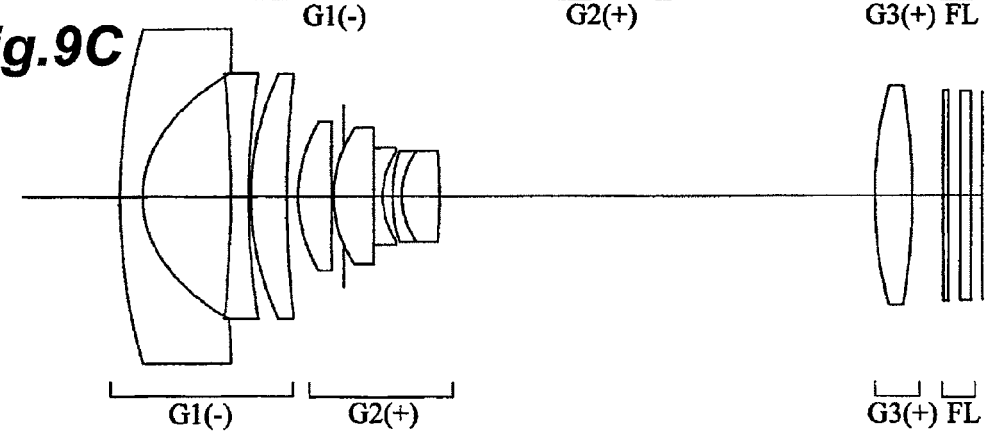
FIG. 9C is a lens configuration diagram showing the structure of the zoom lens system in accordance with Example 5 of the present invention.

FIGS. 9A to 9C show the structure of the zoom lens system ZL5 in accordance with Example 5 of the present invention. In the zoom lens system ZL5 of FIGS. 9A to 9C, the first lens group G1 is composed of, in order from the object along the optical axis, a negative meniscus lens L11 having a convex surface facing the object, a double concave negative lens L12, and a positive meniscus lens L13 having a convex surface facing the object, while the image-side lens surface of the negative meniscus lens L11 (surface No. 2) is formed aspherical. The second lens group G2 is composed of, in order from the object along the optical axis, a positive meniscus lens L21 having a convex surface facing the object, a cemented lens constructed by cementing a double convex positive lens L22 and a double concave negative lens L23 together, and a cemented lens constructed by cementing a negative meniscus lens L24 having a convex surface facing the object and a double convex positive lens L25 together, while the object-side lens surface of the positive meniscus lens L21 (surface No. 7) is formed aspherical. The third lens group G3 is constructed by a double convex positive lens L31 alone. The F-number determining member S is arranged on the image side of the vertex on the optical axis of the positive lens L22 in the second lens group G2 and moves together with the second lens group G2 when varying power from the wide-angle end state to the telephoto end state. The filter group FL is constructed by a low-pass filter, an infrared cut filter, and the like.

The following Table 5 lists values of data in Example 5.

TABLE 5

[Specifications]

f = 4.33~17.19
FNO = 2.62~6.24
2ω = 87.84°~25.48°
Ymax = 3.9

[Lens Data]

| s | r | d | n | ν |
|---|---|---|---|---|
| 1 | 28.0698 | 1.0000 | 42.71 | 1.82080 |
| *2 | 4.7248 | 3.9000 | | |
| 3 | −52.2455 | 0.8000 | 70.45 | 1.48749 |
| 4 | 35.0145 | 0.1000 | | |
| 5 | 12.6646 | 1.6000 | 22.76 | 1.80810 |
| 6 | 46.5550 | (D1) | | |
| *7 | 6.1049 | 1.5000 | 45.46 | 1.80139 |
| 8 | 268.1873 | 0.5500 | | |
| 9 | ∞ | −0.4500 | (F-number determining member) | |
| 10 | 5.2707 | 1.8000 | 53.89 | 1.71300 |
| 11 | −235.2793 | 0.4000 | 28.27 | 2.00330 |
| 12 | 3.5802 | 0.4500 | | |
| 13 | 7.2055 | 0.4000 | 40.77 | 1.88300 |
| 14 | 3.4704 | 1.6500 | 58.89 | 1.51823 |
| 15 | −29.3357 | (D2) | | |
| 16 | 19.4359 | 1.6500 | 65.47 | 1.60300 |
| 17 | −28.8169 | (D3) | | |
| 18 | ∞ | 0.2500 | 64.12 | 1.51680 |
| 19 | ∞ | 0.5000 | | |
| 20 | ∞ | 0.5000 | 64.12 | 1.51680 |
| 21 | ∞ | (BF) | | |

[Aspherical Data]

(Surface No. 2)

κ = 0.2181
A4 = 2.52540E−04
A6 = 6.65750E−06
A8 = −9.04280E−08
A10 = 2.62860E−09

(Surface No. 7)

κ = 0.4618
A4 = 2.39200E−05
A6 = 0.00000E+00
A8 = 0.00000E+00
A10 = 0.00000E+00

[Variable Distance Data]

| | WES Infinity | IS Infinity | TES Infinity |
|---|---|---|---|
| f | 4.33 | 8.60 | 17.19 |
| D1 | 13.3448 | 4.8198 | 0.5000 |
| D2 | 4.1180 | 9.1606 | 19.3049 |
| D3 | 1.3773 | 1.3773 | 1.3773 |

TABLE 5-continued

| BF | 0.4724 | 0.4724 | 0.4724 |
|---|---|---|---|
| TL | 35.9124 | 32.4301 | 38.2545 |

[Group Focal Lengths]

f1 = −9.65
f2 = 9.37
f3 = 19.50

[Values for Conditional Expressions]

(1) Ymax × ft/f12 = 0.71992
(2) (N2nav − 0.8)ft · tanωw/TLw = 0.52694
(3) ft × L12t/|f1| = 0.89067
(4) Nn − Np = 0.48507
(5) Nn + 0.05 × νn = 3.41680

Figure 10A:
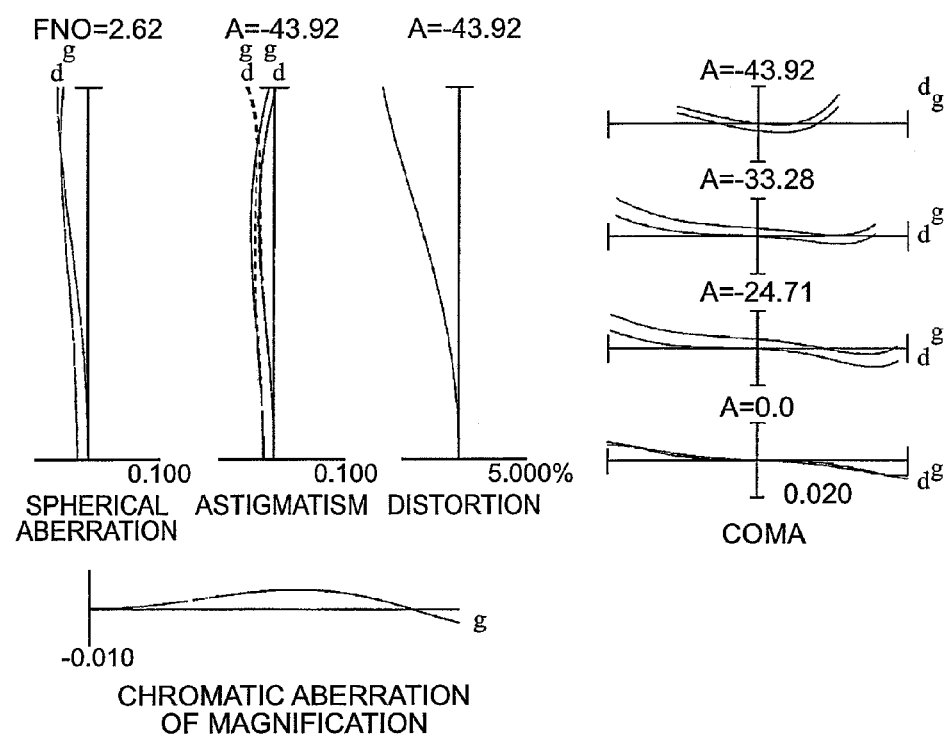
FIG. 10A is an aberration chart in Example 5 in the infinity in-focus state in the wide-angle end.
Figure 10B:
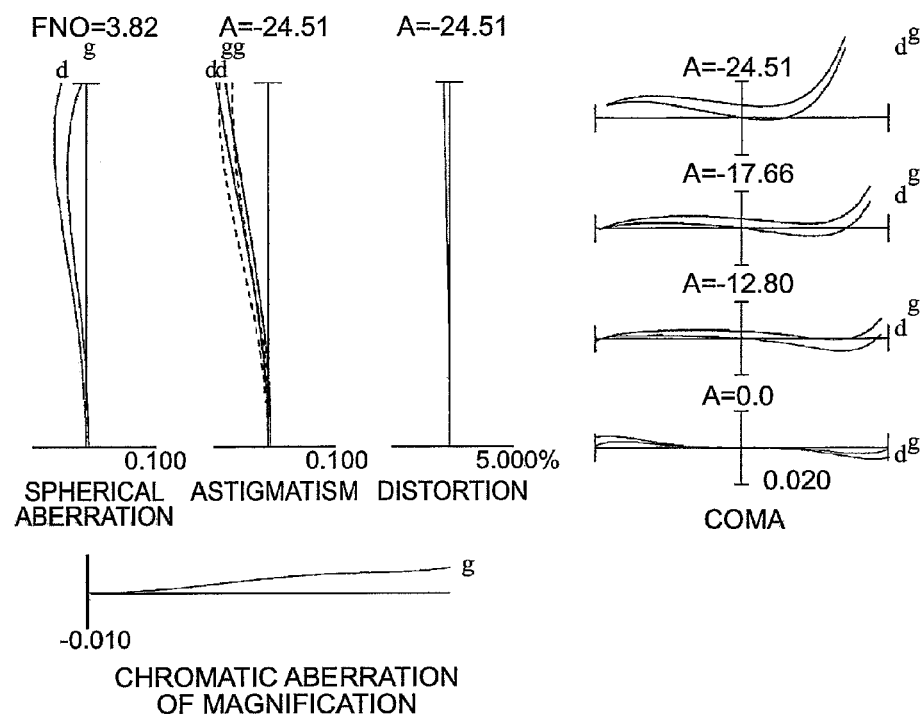
FIG. 10B is an aberration chart in Example 5 in the infinity in-focus state in the intermediate focal length.
Figure 10C:
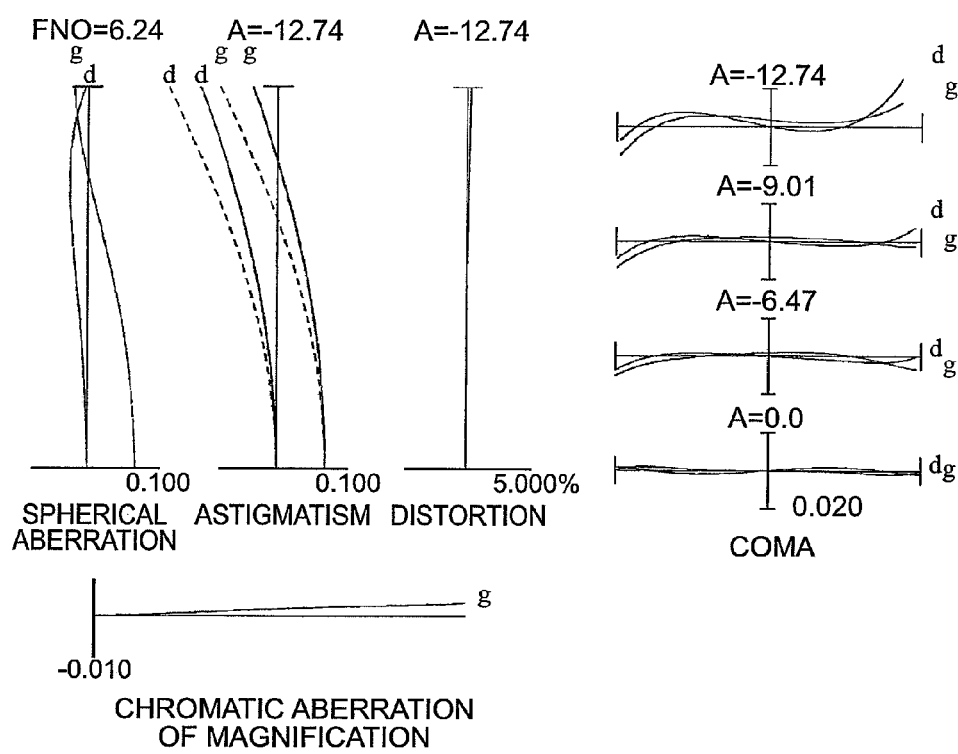
FIG. 10C is an aberration chart in Example 5 in the infinity in-focus state in the telephoto end states.

Thus, the zoom lens system ZL5 in accordance with Example 5 is found to satisfy all the above-mentioned conditional expressions (1) to (5). FIGS. 10A to 10C are aberration charts showing various aberrations in the zoom lens system ZL5 in accordance with Example 5 in the infinity in-focus state in the wide-angle end, intermediate focal length, and telephoto end states, respectively. The aberration charts show that various aberrations are favorably corrected in each focal length state from the wide-angle end state to the telephoto end state, so that the zoom lens system ZL5 in accordance with Example 5 has excellent optical performances.

As in the foregoing, each of the above-mentioned Examples can provide a compact zoom lens system ZL, suitable for solid-state imaging devices, having excellent performances while achieving a wide angle and a high variable power ratio.

The invention is not limited to the foregoing embodiments but various changes and modifications of its components may be made without departing from the scope of the present invention. Also, the components disclosed in the embodiments may be assembled in any combination for embodying the present invention. For example, some of the components may be omitted from all components disclosed in the embodiments. Further, components in different embodiments may be appropriately combined.

What is clamed is:

1. A zoom lens system comprising, in order from an object along an optical axis:

a first lens group having a negative refractive power and including a plurality of lenses;

a second lens group having a positive refractive power; and a third lens group having a positive refractive power;

the following conditional expression being satisfied:

$$0.6 < Ymax \times ft/f1^2 < 1.0$$

where Ymax denotes the maximum image height of the zoom lens system, ft denotes a focal length of the zoom lens system in a telephoto end state, and f1 denotes a focal length of the first lens group.

2. The zoom lens system according to claim 1, wherein the following conditional expression is satisfied:

$$0.47 < (N2nav - 0.8)ft \cdot \tan \omega w/TLw < 0.95$$

where N2nav denotes an average refractive index value at d-line of materials of all the negative lenses included in the second lens group, ωw denotes a half angle of view of the zoom lens system in a wide-angle end state, TLw denotes a total length of the zoom lens system in the wide-angle end state, and ft denotes the focal length of the zoom lens system in the telephoto end state.

3. The zoom lens system according to claim 1, wherein the following conditional expression is satisfied:

$$0.3 < |ft \times L12t/f1| < 2.0$$

where L12t denotes a distance along the optical axis between a lens surface closest to an image in the first lens group and a lens surface closest to the object in the second lens group in the telephoto end state, ft denotes the focal length of the zoom lens system in the telephoto end state, and f1 denotes the focal length of the first lens group.

4. The zoom lens system according to claim 1, wherein the following conditional expression is satisfied:

$$0.36 < Nn - Np < 0.80$$

where Nn denotes the highest refractive index at d-line of materials of negative lenses included in the second lens group, and Np denotes the lowest refractive index at d-line of materials of positive lenses included in the second lens group.

5. The zoom lens system according to claim 1, wherein the following conditional expression is satisfied:

$$3.0 < Nn + 0.05 \times vn$$

where Nn denotes the highest refractive index at d-line of materials of negative lenses included in the second lens group, and vn denotes Abbe number of a material of a lens having the highest refractive index at d-line in materials of negative lenses included in the second lens group.

6. The zoom lens system according to claim 1, wherein the second lens group has an F-number determining member and at least one positive lens positioned on the object side of the F-number determining member.

7. The zoom lens system according to claim 1, wherein the second lens group has, in order from the object along the optical axis, two positive lenses and one negative lens.

8. The zoom lens system according to claim 1, wherein the first lens group includes, in order from the object along the optical axis, a negative meniscus lens and a positive lens.

9. The zoom lens system according to claim 8, wherein the negative meniscus lens is arranged closest to the object in the first lens group.

10. The zoom lens system according to claim 8, wherein at least the image side lens surface in lens surfaces of the negative meniscus lens is formed aspherical.

11. The zoom lens system according to claim 1, wherein, upon zooming from a wide-angle end state to the telephoto end state, at least the first and second lens groups move so as to decrease a distance between the first lens group and the second lens group and increase a distance between the second lens group and the third lens group.

12. An optical device including a zoom lens system, the zoom lens system comprising, in order from an object along an optical axis:

a first lens group having a negative refractive power and inlcuding a plurality of lenses;

a second lens group having a positive refractive power; and a third lens group having a positive refractive power;

the following conditional expression being satisfied:

$$0.6 < Ymax \times ft/f1^2 < 1.0$$

where Ymax denotes the maximum image height of the zoom lens system, ft denotes a focal length of the zoom lens system in a telephoto end state, and f1 denotes a focal length of the first lens group.

13. A method of manufacturing a zoom lens system, the method including the step of arranging, in order from an object along an optical axis, a first lens group having a negative refractive power and inlcuding a plurality of lenses, a second lens group having a positive refractive power, and a third lens group having a positive refractive power, the following conditional expression being satisfied:

$$0.6 < Ymax \times ft/f1^2 < 1.0$$

where Ymax denotes the maximum image height of the zoom lens system, ft denotes a focal length of the zoom lens system in a telephoto end state, and f1 denotes a focal length of the first lens group.

14. The method according to claim 13, wherein the following conditional expression is satisfied:

$$0.47 < (N2nav - 0.8) ft \cdot \tan \omega w/TLw < 0.95$$

where N2nav denotes an average refractive index value at d-line of materials of all the negative lenses included in the second lens group, ww denotes a half angle of view of the zoom lens system in a wide-angle end state, TLw denotes a total length of the zoom lens system in the wide-angle end state, and ft denotes the focal length of the zoom lens system in the telephoto end state.

15. The method according to claim 13, wherein the following conditional expression is satisfied:

$$0.3 < |ft \times L12t/f1| < 2.0$$

where L12t denotes a distance along the optical axis between a lens surface closest to an image in the first lens group and a lens surface closest to the object in the second lens group in the telephoto end state, ft denotes the focal length of the zoom lens system in the telephoto end state, and f1 denotes the focal length of the first lens group.

16. The method according to claim 13, wherein the following conditional expression is satisfied:

$$0.36 < Nn - Np < 0.80$$

where Nn denotes the highest refractive index at d-line of materials of negative lenses included in the second lens group, and Np denotes the lowest refractive index at d-line of materials of positive lenses included in the second lens group.

17. The method according to claim 13, wherein the following conditional expression is satisfied:

$$3.0 < Nn + 0.05 \times vn$$

where Nn denotes the highest refractive index at d-line of materials of negative lenses included in the second lens group, and vn denotes Abbe number of a material of a lens having the highest refractive index at d-line in materials of negative lenses included in the second lens group.

18. The method according to claim 13, wherein the second lens group has an F-number determining member and at least one positive lens positioned on the object side of the F-number determining member.

19. The method according to claim 13, wherein the second lens group has, in order from the object along the optical axis, two positive lenses and one negative lens.

20. The method according to claim 13, wherein the first lens group includes, in order from the object along the optical axis, a negative meniscus lens and a positive lens.

21. The method according to claim 20, wherein the negative meniscus lens is arranged closest to the object in the first lens group.

22. The method according to claim 20, wherein at least the image side lens surface in lens surfaces of the negative meniscus lens is formed aspherical.

23. The method according to claim 13, further comprising the step of verifying a zooming action from a wide-angle end state to the telephoto end state of moving at least the first and second lens groups so as to decrease a distance between the first lens group and the second lens group and increase a distance between the second lens group and the third lens group.

* * * * *